United States Patent
Kitamura et al.

(10) Patent No.: US 10,159,934 B2
(45) Date of Patent: Dec. 25, 2018

(54) EXHAUST GAS PURIFICATION CATALYST

(71) Applicants: CATALER CORPORATION, Kakegawa-shi, Shizuoka (JP); TOYOTA JIDOSHA KABUSHIKI KAISHA, Toyota-shi, Aichi (JP)

(72) Inventors: Ichiro Kitamura, Kakegawa (JP); Keiichi Narita, Kakegawa (JP); Yasutaka Nomura, Kakegawa (JP); Ryota Onoe, Kakegawa (JP); Yuta Morishita, Kakegawa (JP); Junji Kuriyama, Kakegawa (JP); Hiroshi Sekine, Kakegawa (JP); Akihito Inoue, Kakegawa (JP); Daisuke Ochiai, Kakegawa (JP); Jun Sawada, Kakegawa (JP); Naoto Miyoshi, Nagoya (JP); Masahiko Takeuchi, Toyota (JP); Akemi Sato, Toyota (JP); Atsushi Tanaka, Toyota (JP)

(73) Assignees: CATALER CORPORATION, Shizuoka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/550,070

(22) PCT Filed: Feb. 16, 2016

(86) PCT No.: PCT/JP2016/054433
§ 371 (c)(1),
(2) Date: Aug. 10, 2017

(87) PCT Pub. No.: WO2016/133086
PCT Pub. Date: Aug. 25, 2016

(65) Prior Publication Data
US 2018/0028972 A1  Feb. 1, 2018

(30) Foreign Application Priority Data

Feb. 17, 2015 (JP) ................. 2015-028796

(51) Int. Cl.
*B01D 53/94* (2006.01)
*B01J 23/63* (2006.01)
(Continued)

(52) U.S. Cl.
CPC ............... *B01D 53/94* (2013.01); *B01J 23/63* (2013.01); *B01J 35/04* (2013.01); *B01J 37/02* (2013.01)

(58) Field of Classification Search
CPC . B01J 23/63; B01J 35/04; B01J 37/02; B01D 46/2418; B01D 53/86;
(Continued)

(56) References Cited

U.S. PATENT DOCUMENTS 6,753,294 B1 * 6/2004 Brisley ............. B01D 53/9431
502/439
7,097,817 B2 * 8/2006 Brisley ............. B01D 53/9431
423/245.3
(Continued)

FOREIGN PATENT DOCUMENTS

EP  1 985 365 A1  10/2008
JP  2003-154223 A  5/2003
(Continued)

OTHER PUBLICATIONS

Apr. 19, 2016 International Search Report issued in International Patent Application No. PCT/JP2016/054433.
(Continued)

*Primary Examiner* — Timothy C Vanoy
(74) *Attorney, Agent, or Firm* — Oliff PLC

(57) ABSTRACT

Provided is an exhaust gas purification catalyst that combines reduction of pressure loss and enhancement of puri-
(Continued)

fication performance. This invention provides an exhaust gas purification catalyst comprising a wall-flow-type substrate and first and second catalytic layers. The first catalytic layer is provided to the interior of a partition wall, in contact with an entrance cell, from an exhaust inlet-side end in the running direction, having a length L1 less than Lw. The second catalytic layer is provided to the interior of a partition wall, in contact with an exit cell, from an exhaust outlet-side end in the running direction, having a length L2 less than Lw. An internal portion of partition wall in contact with entrance cell has a substrate-exposing segment near the exhaust outlet-side end.

14 Claims, 10 Drawing Sheets

(51) Int. Cl.
  *B01J 35/04* (2006.01)
  *B01J 37/02* (2006.01)
(58) Field of Classification Search
  CPC .......... B01D 53/9468; B01D 2255/902; B01D 2255/9022; B01D 2255/915; B01D 2255/9155; B01D 2279/30; F01N 3/035; F01N 3/0821; F01N 2250/02
  See application file for complete search history.

(56) References Cited

U.S. PATENT DOCUMENTS

| | | | | |
|---|---|---|---|---|
| 8,216,521 B2* | 7/2012 | Li | ...................... | B01D 53/8634 422/177 |
| 8,756,926 B2* | 6/2014 | Chandler | .............. | F01N 3/0222 60/301 |
| 9,346,037 B2* | 5/2016 | Arndt | ................. | B01D 53/8675 |
| 2004/0175315 A1* | 9/2004 | Brisley | .............. | B01D 53/9431 423/239.1 |
| 2006/0057046 A1 | 3/2006 | Punke et al. | | |
| 2009/0087365 A1 | 4/2009 | Klingmann et al. | | |
| 2011/0030346 A1 | 2/2011 | Neubauer et al. | | |
| 2011/0123421 A1* | 5/2011 | Grubert | ................ | B01D 53/944 423/212 |
| 2011/0179777 A1* | 7/2011 | Chandler | .............. | F01N 3/0222 60/297 |
| 2012/0031085 A1 | 2/2012 | Zhang et al. | | |
| 2012/0107203 A1* | 5/2012 | Arnold | ................ | B01J 37/0246 423/213.5 |
| 2013/0213000 A1 | 8/2013 | Segawa | | |
| 2014/0228209 A1 | 8/2014 | Aoki | | |
| 2018/0119589 A1* | 5/2018 | Chandler | ................ | F01N 3/035 |

FOREIGN PATENT DOCUMENTS

| | | |
|---|---|---|
| JP | 2005-500147 A | 1/2005 |
| JP | 2007-185571 A | 7/2007 |
| JP | 2009-022953 A | 2/2009 |
| JP | 2009-082915 A | 4/2009 |
| JP | 2010-269205 A | 12/2010 |
| JP | 2011-212508 A | 10/2011 |
| JP | 2012-035206 A | 2/2012 |
| JP | 2012-036821 A | 2/2012 |
| JP | 2012-096201 A | 5/2012 |
| JP | 2013-500857 A | 1/2013 |
| JP | 2013-099748 A | 5/2013 |
| JP | 2014-188466 A | 10/2014 |
| WO | 0112320 A1 | 2/2001 |

OTHER PUBLICATIONS

Jan. 4, 2018 Search Report issued in European Patent Application No. 16752472.7.
Jul. 11, 2018 extended European Search Report issued in Application No. 16752472.7.

* cited by examiner

⟶ Running direction
(axial direction of cylinder)

EXHAUST GAS PURIFICATION CATALYST

TECHNICAL FIELD

The present invention relates to an exhaust gas purification catalyst provided to an exhaust system of an internal combustion system. In particular, it relates to a wall-flow-type exhaust gas purification catalyst.

The present application claims priority to Japanese Patent Application No. 2015-28796 filed on Feb. 17, 2015; the entire contents of which are incorporated herein by reference.

BACKGROUND ART

Exhaust gas emitted from an internal combustion system such as an automobile engine comprises toxic components such as particulate matter (PM), hydrocarbons (HC), carbon monoxide (CO), and nitrogen oxides ($NO_x$). Conventionally, to efficiently eliminate these exhaust components, an exhaust purification catalyst having a catalytic layer is used, with the catalytic layer comprising a carrier and a catalytic metal supported on the carrier.

For instance, a wall-flow-type exhaust gas purification catalyst comprises a wall-flow-type substrate and a catalytic layer. The wall-flow-type substrate has an entrance cell that is open on the exhaust inlet-side end, an exit cell that is open on the exhaust outlet-side end, and a porous partition wall (a ribbed wall) separating the two cells. The catalytic layer is provided to the partition wall. Exhaust gas emitted from the internal combustion system flows via the exhaust inlet-side end into the entrance cell, passes through micro pores of the porous partition wall, and flows out of the exhaust outlet-side end of the exit cell. During this, upon contact between the exhaust gas and the catalytic layer (catalytic metal), the exhaust gas components are purified (detoxified).

As for the conventional art documents related to this, Patent Documents 1 to 7 are cited. For instance, Patent Document 1 discloses an exhaust gas purification catalyst comprising a catalytic layer having a two-layer structure. In particular, Patent Document 1 discloses an exhaust gas purification catalyst that has a first catalytic layer (a Pd-containing layer) in the entire interior of the partition wall and a second catalytic layer (a Rh-containing layer) over the entire surface of the partition wall to completely cover the first catalytic layer.

CITATION LIST

Patent Literature

[Patent Document 1] Japanese Patent Application Publication No. 2009-82915
[Patent Document 2] Japanese Patent Application Publication No. 2007-185571
[Patent Document 3] Japanese Patent Application Publication No. 2013-500857
[Patent Document 4] Japanese Patent Application Publication No. 2010-269205
[Patent Document 5] Japanese Patent Application Publication No. 2014-188466
[Patent Document 6] Japanese Patent Application Publication No. 2009-22953
[Patent Document 7] Japanese Patent Application Publication No. 2003-154223

SUMMARY OF INVENTION

The exhaust gas purification catalyst of Patent Document 1 has the Pd-containing layer and the Rh-containing layer separated as internal and external to the partition wall; and therefore, it is suited for inhibiting sintering of the catalytic metals. However, because the Pd-containing layer is present in the entire interior of the partition wall and the Rh-containing layer is placed to cover the surface of the partition wall, there is a problem of increased pressure reducing combustion engine power. On the other hand, with a focus placed on pressure loss, if, for instance, the coating densities of the catalytic layers are decreased, exhaust gas and the catalytic metals may have fewer opportunities for contact, resulting in poorer exhaust gas purification performance.

Lately, regulations on emissions and fuel consumption tend to be further tightened. Thus, with respect to an exhaust gas purification catalyst, along with reduction of pressure loss, further enhanced exhaust gas purification performance is desired.

The present invention has been made in view of these circumstances with an objective to provide a wall-flow-type exhaust gas purification catalyst that brings about both pressure loss reduction and enhancement of exhaust gas purification performance at a high level.

The present inventors have conducted many studies in various aspects to find a solution to the problem in exhaust gas purification catalysts comprising wall-flow-type substrates. As a result, it has been found that particulate matter (PM) such as soot and ash is likely to accumulate near the exhaust outlet-side end in entrance cells. Based on this knowledge, the present invention has been completed upon further earnest studies.

The present invention discloses a wall-flow-type exhaust gas purification catalyst to be placed in an exhaust pipe of an internal combustion system to purify exhaust gas emitted from the internal combustion system. The exhaust gas purification catalyst comprises a substrate having a wall-flow-type structure, a first catalytic layer, and a second catalytic layer. In the substrate, an entrance cell that is open on the exhaust inlet-side end and an exit cell that is open on the exhaust outlet-side end are separated with a porous partition wall. The first catalytic layer is provided to an internal portion of the partition wall in contact with the entrance cell, having a length $L_1$ from the exhaust inlet-side end in the running direction of the partition wall with $L_1$ being less than the total length $L_w$ of the partition wall in the running direction. The second catalytic layer is provided to an internal portion of the partition wall in contact with the exit cell, having a length $L_2$ from the exhaust outlet-side end in the running direction of the partition wall with $L_2$ being less than the total length $L_w$ of the partition wall in the running direction. In the internal portion of the partition wall in contact with the entrance cell, near the exhaust outlet-side end, the catalyst has a substrate-exposing segment free of the first and second catalytic layers.

In the exhaust gas purification catalyst, in the prescribed locations inside the partition wall of the substrate, the two catalytic layers and the substrate-exposing segment are placed to adjust the exhaust gas flow (e.g. the flow field and the flow rate of exhaust gas). This can effectively reduce the pressure loss and greatly increase the purification performance (e.g. $NO_x$ purification performance) of the catalysts. Thus, the present invention can bring about an exhaust gas purification catalyst that combines pressure loss reduction and enhancement of purification performance as compared to conventional products.

As used herein, the concept of "(a catalytic layer) being provided to an internal portion of the partition wall" means that the catalytic layer is more heavily present (localized) in the inside of the partition wall than in the outside (typically on the surface) of the partition wall. For instance, when a partition wall cross section of the first catalytic layer is analyzed under an electron microscope, with the overall coating density over a length $0.1L_w$ from the exhaust inlet-side end in the running direction being 100%, it means that the density distribution of the coating present in the inside of the partition wall is typically 80% or higher, for instance, 90% or higher, or preferably 95% or higher, in particular, essentially 100%. Or, for instance, when a partition wall cross section of the second catalytic layer is analyzed under an electron microscope, with the overall coating density over a length $0.1L_w$ from the exhaust outlet-side end in the naming direction being 100%, it means that the density distribution of the coating present in the inside of the partition wall is typically 80% or higher, for instance, 90% or higher, or preferably 95% or higher, in particular, essentially 100%. Thus, the concept should be clearly distinguished from, for instance, an embodiment where a catalytic layer is provided to the surface of a partition wall and some of the catalytic layer is unintentionally impregnated into the partition wall.

In a preferable embodiment of the exhaust gas purification catalyst disclosed herein, the substrate-exposing segment is provided to an internal portion of the partition wall in contact with the entrance cell, having a length $L_3$ from the exhaust outlet-side end in the limning direction of the partition wall, with $L_w$ and $L_3$ satisfying $0.2L_w \leq L_3 \leq 0.4L_w$.

In another preferable embodiment of the exhaust gas purification catalyst disclosed herein, the partition wall has a total thickness $T_w$ in the thickness direction perpendicular to the running direction, and the thickness $T_3$ of the substrate-exposing segment satisfies $0.4T_w \leq T_3$.

In another preferable embodiment of the exhaust gas purification catalyst disclosed herein, the ratio ($D_1/D_2$) of the coating density $D_1$ of the first catalytic layer to the coating density $D_2$ of the second catalytic layer is 1.3 to 1.6.

In another preferable embodiment of the exhaust gas purification catalyst disclosed herein, $L_w$, $L_1$ and $L_2$ satisfy $1.005L_w \leq (L_1+L_2) \leq 1.3L_w$. That is, the first and second catalytic layers are formed, partially overlapping in the running direction.

In another preferable embodiment of the exhaust gas purification catalyst disclosed herein, $L_w$ and $L_2$ satisfy $0.4L_w \leq L_2 \leq 0.8L_w$.

In another preferable embodiment of the exhaust gas purification catalyst disclosed herein, the first catalytic layer comprises alumina. With the total non-volatile content of the first catalytic layer being 100% by mass, the alumina content is 15% to 50% by mass.

In another preferable embodiment of the exhaust gas purification catalyst disclosed herein, the first catalytic layer comprises cerium. With the total non-volatile content of the first catalytic layer being 100% by mass, the cerium content is 5% to 35% by mass.

When at least one of these conditions is satisfied, reduction of pressure loss and enhancement of purification performance can be achieved together at a higher level. Thus, the effects of this invention can be brought to a higher level.

As used herein, the term "coating density" refers to the coating amount (g) of a catalytic layer per L volume of substrate (total bulk volume including the cell volume). The unit is g/L.

For instance, a reference substrate prior to catalytic layer coating and a catalytic layer-bearing substrate are individually suspended in a solvent (e.g. in water); their masses in the solvent are determined by the Archimedes method; and the coating density can be determined by the next equation (1):

$$\rho = W \times \rho(l)/(W-W') \qquad (1)$$

Here, $\rho$ is the coating density (g/L) of the catalytic layer; W is the mass of the catalytic layer in the atmosphere determined by subtracting the mass of the reference substrate in the atmosphere from the mass of the catalytic layer-bearing substrate in the atmosphere; $\rho(l)$ is the density of the solvent (e.g. water).

In another preferable embodiment of the exhaust gas purification catalyst disclosed herein, the partition wall has a total thickness $T_w$ in the thickness direction perpendicular to the running direction, and the thickness $T_1$ of the first catalytic layer satisfies $0.4L_w \leq T_1 \leq 0.6T_w$. The thickness $T_2$ of the second catalytic layer satisfies $0.4T_w \leq T_2 \leq 0.6T_w$.

This can greatly reduce the increase in pressure loss. Thus, the effects of this invention can be brought to a higher level.

In another preferable embodiment of the exhaust gas purification catalyst disclosed herein, the first catalytic layer comprises rhodium. With the precious metal (rhodium) with high catalytic activities placed in the first catalytic layer, the purification performance (especially for $NO_x$) can be effectively enhanced even with the limited amounts of catalytic metals.

In another preferable embodiment of the exhaust gas purification catalyst disclosed herein, the second catalytic layer comprises palladium. In such an embodiment, it can efficiently purify toxic components of exhaust gas. As a result, the exhaust purification performance can be further enhanced.

In another preferable embodiment of the exhaust gas purification catalyst disclosed herein, the second catalytic layer comprises alumina. With the total non-volatile content of the second catalytic layer being 100% by mass, the alumina content is 20% to 65% by mass.

In another preferable embodiment of the exhaust gas purification catalyst disclosed herein, the second catalytic layer comprises cerium. With the total non-volatile content of the second catalytic layer being 100% by mass, the cerium content is 2% to 30% by mass.

In another preferable embodiment of the exhaust gas purification catalyst disclosed herein, the second catalytic layer comprises barium. With the total non-volatile content of the second catalytic layer being 100% by mass, the barium content is 12% by mass or less.

These can combine reduction of pressure loss and enhancement of purification performance at a higher level. Thus, the effects of this invention can be brought to a higher level.

DESCRIPTION OF EMBODIMENTS

Figure 1:
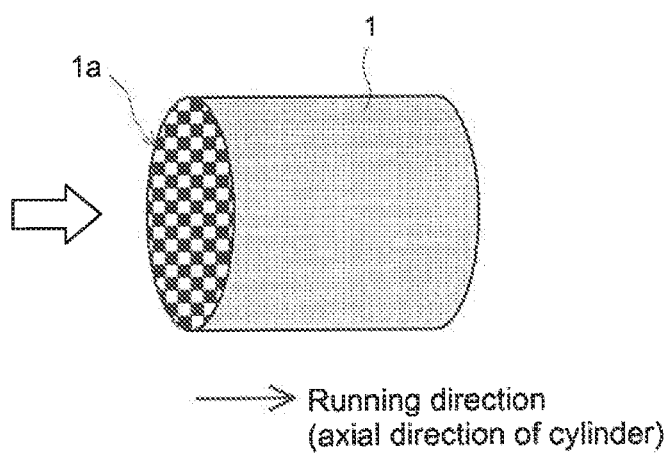
FIG. 1 shows a perspective diagram schematically illustrating the substrate in the exhaust gas purification catalyst according to an embodiment.

Some preferred embodiments of the present invention are described below with reference to drawings. In the drawings below, a common reference numeral may be assigned to members or sites producing the same effects, and duplicated descriptions are sometimes omitted or simplified. Dimensional relationships (length, width, thickness, etc.) in the respective drawings do not necessarily represent the accurate dimensional relationships. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

As used herein, the expression "A≈B (note: A and B are arbitrary values)" may include variation (differences among individual pieces) occurring during the manufacturing process. For instance, it means that the difference between A and B is about ±10%, typically about ±5%, or preferably about ±2%.

As used herein, the expression "A to B (note: A and B are arbitrary values)" includes the values A and B (the minimum value and the maximum value).

The exhaust gas purification catalyst disclosed herein is a so-called wall-flow-type, comprising a wall-flow substrate and two catalytic layers (the first and second catalytic layers). Such an exhaust gas purification catalyst exhibits significant effects unique to the present invention, with the interior of the substrate provided with two catalytic layers and at least one substrate-exposing segment in a certain arrangement. Thus, other features are not particularly limited and can be arbitrarily selected according to various standards.

For the substrate constructing the frame of the exhaust gas purification catalyst, various forms of substrates conventionally used for this type of application can be used.

FIG. 1 shows a schematic perspective view of substrate 1 in exhaust gas purification catalyst 10 according to an embodiment. This embodiment uses a honeycomb substrate (honeycomb structure) 1 having a cylindrical appearance. The appearance of the entire honeycomb substrate 1 can be, for instance, elliptic cylindrical, polygonal cylindrical, etc., instead of the cylindrical shape shown in FIG. 1. Honeycomb substrate 1 has partition walls formed in the running direction (in the axial direction of the cylinder) and several cells that are separated with the partition walls and arranged regularly. In honeycomb substrate 1, at one end 1a, open ends of the running direction are alternately sealed between adjacent cells.

Figure 2:
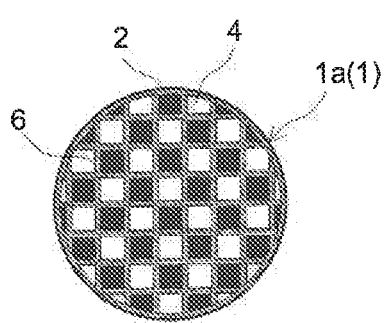
FIG. 2 shows a cross-sectional diagram schematically illustrating one end of the honeycomb substrate in FIG. 1.

FIG. 2 shows a schematic cross-sectional view of the end 1a of honeycomb substrate 1 in FIG. 1. In this embodiment, the end 1a is circular. At the end 1a, porous partition walls 6 are placed between adjacent cells. Sealing members 2 and openings 4 are arranged in a checkered pattern.

As the material of honeycomb substrate 1, various materials conventionally used for this type of application can be used. In view of harsh conditions under which internal combustion systems may be operated, it is preferably formed from a material having stable properties even when exposed to exhaust gas at a high temperature (e.g. 400° C. or above). Preferable examples include ceramic such as cordierite, aluminum titanate and silicon carbide (SiC), and alloys such as stainless steel.

Honeycomb substrate 1 has a storage capacity (a total cell volume) of typically 0.1 L or greater, or preferably 0.5 L or greater; it can be, for instance, 5 L or less, preferably 3 L or less, or more preferably 2 L or less. The overall length of honeycomb substrate 1 in the axial direction of the cylinder (i.e. the total length $L_w$ of a partition wall 6 in the running direction) can be typically 10 mm to 500 mm, for instance, about 50 mm to 300 mm.

Figure 3:
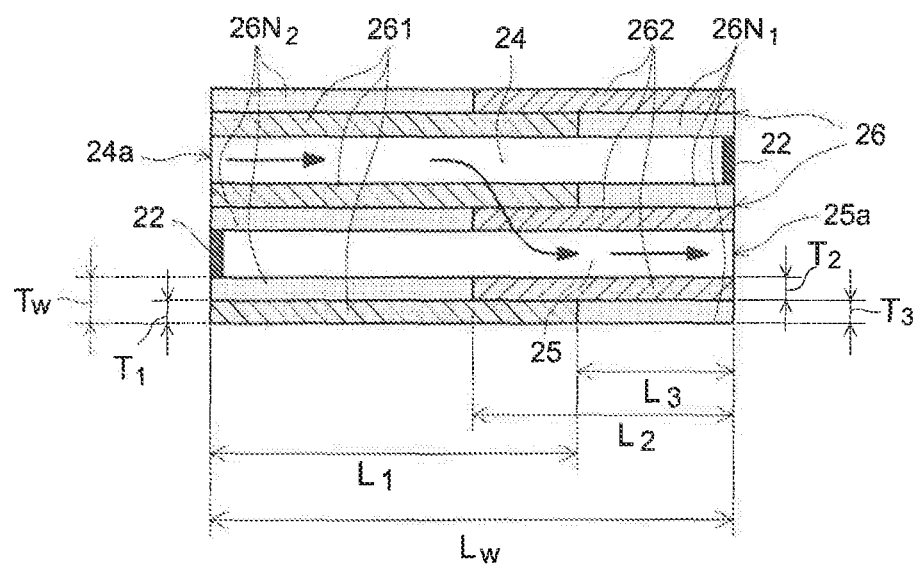
FIG. 3 shows an enlarged cross-sectional diagram schematically illustrating the structure in the vicinity of the partition wall of the exhaust gas purification catalyst according to an embodiment.

FIG. 3 shows a schematic enlarged cross-sectional view of the structure of exhaust gas purification catalyst 10 according to an embodiment, showing the vicinity of partition wall 26. In the substrate of exhaust gas purification catalyst 10 shown in FIG. 3, an entrance cell 24 (in a U shape) with an opening 4 on the exhaust inlet-side end 24a and an exit cell 25 (in a U shape) with an opening 4 on the exhaust outlet-side end 25a are separated with a porous partition wall 26. To the exhaust outlet-side end of entrance cell 24 and the exhaust inlet-side end of exit cell 25, sealing members 22 are provided to seal the cells.

For instance, entrance cell 24 and exit cell 25 can be designed to have shapes and dimensions suited in view of the flow rate and components of exhaust gas supplied to the exhaust gas purification catalyst 10, etc. The shape of entrance cell 24 or exit cell 25 is not particularly limited; for instance, it can be various geometric shapes such as quadrilaterals including square, parallelogram, rectangle and trapezoid; triangle, other polygon (e.g. hexagon, octagon), and circle.

Partition wall 26 has a porous structure permeable to exhaust gas. The overall thickness $T_w$ of partition wall 26 (i.e. the length of partition wall 6 in a direction perpendicular to its running direction) can be, for instance, about 0.05 mm to 2 mm from the standpoint of enhancing the exhaust purification performance, increasing the mechanical strength, reducing the increase in pressure loss, etc. The porosity of partition wall 26 can usually be about 40% to 70% from the standpoint of increasing the mechanical strength, reducing the increase in pressure loss, etc. The average pore diameter of partition wall 26 can usually be about 10 μm to 40 μm from the standpoint of increasing the PM-collecting ability, reducing the increase in pressure loss, etc.

Exhaust gas purification catalyst 10 disclosed herein comprises two catalytic layers having prescribed characteristics (e.g. lengths, thicknesses, and coating densities)— namely, the first catalytic layer 261 and the second catalytic layer 262—in the interior of partition wall 26 (in particular, on the pore surface in partition wall 26). With the catalytic layers placed in the interior of partition wall 26, that is, with the first and second catalytic layers 261 and 262 not substantially (intentionally) provided to the surface of partition wall 26, it is possible to suitably obtain flow channels for exhaust gas while effectively reducing the increase in pressure loss.

In exhaust gas purification catalyst 10, exhaust gas released from an internal combustion system flows from the exhaust inlet-side end 24a into entrance cell 24. As indicated with the arrow in FIG. 3, upon entering entrance cell 24, the exhaust gas passes through pores in porous partition wall 26 and flows out of the exhaust outlet-side end 25a. In exhaust gas purification catalyst 10, while the exhaust gas passes through the interior of partition wall 26, it makes contact with the catalytic layers (the first catalytic layer 261 and/or the second catalytic layer 262). This purifies (detoxifies) toxic components of the exhaust gas. This purifies (detoxifies) toxic components of exhaust gas. In other words, exhaust gas undergoes purification reactions primarily while passing through partition wall 26. Thus, the arrangement of the catalytic layers in the partition wall is particularly important.

For instance, HC and CO in the exhaust gas are oxidized by the catalytic activities of a catalytic layer and converted (purified) to water ($H_2O$), carbon dioxide ($CO_2$), etc. $NO_x$ is reduced by the catalytic activity of a catalytic layer and converted (purified) to nitrogen ($N_2$). PM is unlikely to pass through pores in partition wall 26; and therefore, it generally accumulates on partition wall 26 in entrance cell 24 (e.g. in an area near sealing member 22 on partition wall 26). The accumulated PM is decomposed by spontaneous combustion catalyzed by the first catalytic layer 261 or by forced combustion at a prescribed temperature (e.g. about 500° C. to 700° C.).

Both the first and second catalytic layers 261 and 262 are provided to the interior of partition wall 26 in exhaust gas purification catalyst 10. When both the two catalytic layers are provided to the interior of partition wall 26, a large opening area of partition wall 26 can be obtained as compared to, for instance, an embodiment where at least one of the two catalytic layers is provided to the surface of partition wall 26.

The first catalytic layer 261 is formed in the interior of partition wall 26 in contact with entrance cell 24, from the exhaust inlet-side end 24a in the miming direction of partition wall 26.

The length $L_1$ of the first catalytic layer in the running direction is not particularly limited as long as it is less than the total length $L_w$ of partition wall 26 in the running direction (i.e. $L_1 < L_w$). When $L_1 < L_w$ is satisfied, the increase in pressure loss can be favorably reduced to bring the effects of this invention to a higher level. From such a standpoint, $L_1$ preferably satisfies $L_1 \leq 0.9 L_w$.

According to the studies by the present inventors, PM in exhaust gas is unlikely to pass through partition wall 26 and tends to accumulate near the exhaust outlet-side end 25a in entrance cell 24. Thus, in an internal portion of partition wall 26 in contact with entrance cell 24, it is preferable that the first catalytic layer 261 is absent in the vicinity of the exhaust outlet-side end 25a. This can favorably reduce the increase in pressure loss. From such a standpoint, $L_1 \leq 0.8 L_w$ is preferably satisfied, and $L_1 \leq 0.75 L_w$ is more preferably satisfied. In other words, in the interior of partition wall 26 in contact with entrance cell 24, it is preferable that the first catalytic layer 261 is not formed in the running direction from the exhaust outlet-side end 25a over at least 10% (preferably 20%, more preferably 25%) of $L_w$. In the embodiment shown in FIG. 3, $L_1 \approx 0.7 L_w$, and the first catalytic layer 261 is absent in the running direction from the exhaust outlet-side end 25a up to 30% of $L_w$.

In another favorable example, the length $L_1$ of the first catalytic layer 261 satisfies $0.6 L_w \leq L_1$. This can further increase the purification performance of the catalyst.

For instance, in an eco-friendly car equipped with an energy-saving system such as a hybrid engine and a stop-start system, the engine stops and restarts repeatedly when the car makes temporary stops while driving or waiting at traffic lights. In such an eco-friendly car, as the engine stops and restarts, the exhaust gas temperature may become unstable or may temporarily fall below the catalyst activation temperature. When the length $L_1$ of the first catalytic layer 261 in the miming direction is at least the prescribed value, the heat retention of the catalyst can be enhanced. Thus, even when used in such an eco-friendly car, excellent catalytic activities can be stably obtained.

The thickness $T_1$ of the first catalytic layer 261 is not particularly limited because it could be different as well depending on, for instance, the thickness of partition wall 26 and the length of the catalytic layer in the running direction. The first catalytic layer 261 is typically formed thinner than the total thickness $T_w$ of partition wall 26 so that it is in contact with entrance cell 24, but not in contact with exit cell 25 (i.e. $T_1<T_w$). Although it also depends on the length $L_2$ in the running direction and the thickness $T_2$ of the second catalytic layer 262, the thickness $T_1$ of the first catalytic layer 261 can be generally $0.2T_w$ or greater, typically $0.25T_w$ or greater, or preferably $0.3T_w$ or greater, for instance, $0.35T_w$ or greater; and it can be $0.9T_w$ or less, or typically $0.8T_w$ or less, for instance, $0.7T_w$ or less. By this, reduction of pressure loss can be combined with retention and enhancement of purification performance at a higher level. In the embodiment shown in FIG. 3, $T_1 \approx 0.5T_w$.

In a preferable example, although it also depends on, for instance, the thickness $T_2$ of the second catalytic layer 262, etc., $T_1$ satisfies $0.4T_w \leq T_1 \leq 0.6T_w$. In particular, $T_1$ preferably satisfies $0.5T_w \leq T_1 \leq 0.6T_w$. This can combine reduction of pressure loss with retention and enhancement of purification performance at a higher level.

The second catalytic layer 262 is formed in the interior of partition wall 26 in contact with exit cell 25, from the exhaust outlet-side end 25a in the running direction.

The length $L_2$ of the second catalytic layer in the running direction is not particularly limited as long as it is less than the total length $L_w$ of partition wall 26 in the running direction (i.e. $L_2<L_w$). When $L_1<L_w$ is satisfied, the increase in pressure loss can be favorably reduced to bring the effects of this invention to a higher level.

In a favorable example, the length $L_2$ of the second catalytic layer 262 satisfies $L_2 \leq 0.8L_w$. In other words, the second catalytic layer 262 is absent in the running direction from the exhaust inlet-side end 24a up to 20% of $L_w$. This can more favorably inhibit the increase in pressure loss. Exhaust gas is more likely to flow near the exhaust inlet-side end 24a in partition wall 26; and therefore, the effect to increase heat retention can be obtained to a greater extent. From the standpoint of reducing pressure loss, $L_2 \leq 0.75L_w$ is more preferably satisfied. In the embodiment shown in FIG. 3, $L_2 \approx 0.5L_w$.

In another favorable example, the length $L_2$ of the second catalytic layer 262 satisfies $0.35L_w$. This can further enhance the purification performance of the catalyst. From such a standpoint, $L_2$ preferably satisfies $0.4L_w \leq L_2$, for instance, $0.5L_w \leq L_2$. Based on the knowledge of the present inventors, $L_2$ particularly preferably satisfies $0.6L_w \leq L_2 \leq 0.75L_w$, in view of the high durability, that is, in view of obtaining enhancement of purification performance of the catalyst and reduction of pressure loss at a high level for a long period.

The length $L_1$ of the first catalytic layer 261 can be the same as or different from the length $L_2$ of the second catalytic layer 262.

The thickness $T_2$ of the second catalytic layer 262 is not particularly limited because it could be different as well depending on, for instance, the thickness of partition wall 26 and the length of the catalytic layer in the running direction. The second catalytic layer 262 is typically formed thinner than the total thickness $T_w$ of partition wall 26 so that it is in contact with exit cell 25, but not in contact with entrance cell 24 (i.e. $T_2<T_w$). Although it also depends on the length $L_1$ in the miming direction and the thickness $T_1$ of the first catalytic layer 261 described above, the thickness $T_2$ of the second catalytic layer 262 can be generally $0.2T_w$ or greater, typically $0.25T_w$ or greater, or preferably $0.3T_w$ or greater, for instance, $0.35T_w$ or greater; and it can be $0.9T_w$ or less, or typically $0.8T_w$ or less, for instance, $0.7T_w$ or less. By this, reduction of pressure loss can be combined with retention and enhancement of purification performance at a higher level. In the embodiment shown in FIG. 3, $T_2 \approx 0.5T_w$.

In a preferable example, although it also depends on, for instance, the thickness $T_1$ of the first catalytic layer 261, etc., $T_2$ satisfies $0.4T_w \leq T_2 \leq 0.6T_w$. In particular, $T_2$ preferably satisfies $0.5T_w \leq T_1 \leq 0.6T_w$. This can combine reduction of pressure loss with retention and enhancement of purification performance at a higher level.

The thickness $T_1$ of the first catalytic layer 261 can be the same as or different from the thickness $T_2$ of the second catalytic layer 262.

In a preferable embodiment, in the interior of partition wall 26, the first catalytic layer 261 and the second catalytic layer 262 overlap each other in the running direction of partition wall 26. That is, the total length $L_w$ of partition wall 26, the length $L_1$ of the first catalytic layer 261 and the length $L_2$ of the second catalytic layer 262 satisfy $L_w<(L_1+L_2)$ $<2L_w$. The first and second catalytic layers 261 and 262 are purposefully formed to partially overlap in the running direction so as to eliminate channels that run from entrance cell 24 through catalytic layer-free regions to reach exit cell 25. Thus, it can be made sure that the exhaust gas comes in contact with the catalytic layer(s) (the first catalytic layer 261 and/or the second catalytic layer 262). As a result, the exhaust gas can be more suitably purified to greatly reduce exhaust gas emissions.

The length over which the two catalytic layers (the first and second catalytic layers 261 and 262) overlap in the running direction is not particularly limited because it could be different as well depending on, for instance, the thicknesses of the respective catalytic layers.

In a favorable example, from the standpoint of bringing the effects of this invention to a higher level, the total length $L_w$ of partition wall 26, the length $L_1$ of the first catalytic layer 261 and the length $L_2$ of the second catalytic layer 262 satisfy $(L_1+L_2) \leq 1.45L_w$, or preferably satisfy $1.005L_w \leq (L_1+L_2) \leq 1.3L_w$. In other words, the overlapping length (the length of the overlap) of the two catalytic layers in the running direction can be generally 45% of $L_w$ or less, or preferably 30% or less, for instance, 20% or less; and it can be 0.5% of $L_w$ or greater, or preferably 1% or greater, for instance, 10% or greater. In the embodiment shown in FIG. 3, $L_1+L_2 \approx 1.2L_w$, and the two catalytic layers overlap over a length equivalent to 20% of $L_w$.

In another favorable example, in the interior of partition wall 26, the first and second catalytic layers 261 and 262 overlap each other in the thickness direction or they are close to each other. This can combine a decrease in pressure loss and greater retention of purification performance, at a higher level.

In a favorable example, the total thickness $T_w$ of partition wall 26, the thickness $T_1$ of the first catalytic layer 261 and the thickness $T_2$ of the second catalytic layer 262 satisfy $0.8T_w \leq (T_1+T_2) \leq 1.2T_w$. In other words, the two catalytic layers may overlap through a thickness up to 20% of $T_w$ or they can be apart by a space up to 20% of $T_w$. This can more effectively reduce exhaust gas emissions. In the embodiment shown in FIG. 3, the first and second catalytic layers 261 and 262 are in contact in the thickness direction of partition wall 26. That is, $T_1+T_2 \approx T_w$.

In the interior of partition wall 26 in contact with entrance cell 24, exhaust gas purification catalyst 10 disclosed herein has a first substrate-exposing segment $26N_1$ in an area near (typically next to) the exhaust outlet-side end 25a. The first substrate-exposing segment $26N_1$ is free of the first and second catalytic layers 261 and 262. According to the studies by the present inventors, particulate matter (PM) in exhaust gas tends to accumulate in an area near the exhaust outlet-side end 25a of entrance cell 24. Thus, for instance, even in an embodiment where PM is formed in a large amount, the presence of the first substrate-exposing segment $26N_1$ in such an area can minimize the influence. In other words, the pressure loss can be certainly reduced to a low level.

The dimensions (length and thickness) of the first substrate-exposing segment $26N_1$ are not particularly limited. For instance, they can be selected in view of the properties of the substrate and the application (e.g. the expected amount of PM formed and the engine power).

In a favorable example, the first substrate-exposing segment $26N_1$ is provided from the exhaust outlet-side end $25a$ in the naming direction of partition wall $26$. The length $L_3$ of the first substrate-exposing segment $26N_1$ in the running direction is generally $0.1L_w$ or greater, preferably $0.2L_w$ or greater; it is typically $0.5L_w$ or less, preferably $0.4L_w$ or less, for instance, $0.3L_w$ or less. In such an embodiment, the exhaust gas flow in exhaust gas purification catalyst $10$ can be favorably adjusted to maintain good purification performance while further reducing the pressure loss. Thus, the effects of this invention can be brought to a higher level.

In another favorable example, the thickness $T_3$ of the first substrate-exposing segment $26N_1$ is $0.4T$ or greater, for instance and, for instance, $0.6T_w$ or less from the surface in contact with entrance cell $24$. In such an embodiment, the exhaust gas flow in exhaust gas purification catalyst $10$ can be favorably adjusted to maintain good purification performance while further reducing the pressure loss. Thus, the effects of this invention can be brought to a higher level.

In a favorable embodiment, in the interior of partition wall $26$ in contact with exit cell $25$, catalyst $10$ has a second substrate-exposing segment $26N_2$ in an area near (typically next to) the exhaust inlet-side end $24a$. By this, the increase in pressure loss can be effectively reduced even when, for instance, the first catalytic layer $261$ has a relatively high coating density (absolute value). Thus, the effects of this invention can be brought to a higher level.

The dimensions (length and thickness) of the second substrate-exposing segment $26N_2$ are not particularly limited. For instance, they can be selected in view of the properties of the substrate and the application (e.g. the expected amount of PM formed and the engine power). In a favorable example, the length of the second substrate-exposing segment $26N_2$ is at least $0.1L_w$ in the running direction from the exhaust outlet-side end $25a$, for instance, $0.1L_w$ to $0.3L_w$, and preferably $0.4L_w$ to $0.6L_w$. In another favorable example, the thickness of the second substrate-exposing segment $26N_2$ is at least $0.1T_w$ from the surface in contact with exit cell $25$, for instance, $0.1T_w$ to $0.3T_w$. In such an embodiment, while improving the retention of purification performance, the pressure loss can be further reduced. Thus, the effects of this invention can be brought to a higher level.

For instance, when the lengths of the two catalytic layers satisfy $L_w<(L_1+L_2)$, or when the thicknesses of the two catalytic layers satisfy $T_w<(T_1+T_2)$, the first substrate-exposing segment $26N_1$ can be provided not only to areas near the exhaust outlet-side end $25a$, but also over a greater region. The first and second substrate-exposing segments $26N_1$ and $26N_2$ can be one three-dimensionally-joined unit.

The two catalytic layers (the first and second catalytic layers $261$ and $262$) serve as fields for exhaust gas purification, thereby constituting the main part of exhaust gas purification catalyst $10$, with each layer comprising a catalytic metal serving as oxidation and/or reduction catalyst, and a carrier supporting the catalytic metal.

As the catalytic metal, one, two or more species can be suitably selected among various metals known to serve as oxidation catalysts or reduction catalysts. Typical examples include precious metals such as rhodium (Rh), palladium (Pd) and platinum (Pt) of the platinum group. Alternatively, ruthenium (Ru), osmium (Os), iridium (Ir), gold (Au), silver (Ag), copper (Cu), nickel (Ni), iron (Fe) and cobalt (Co) as well as alloys of the precious metals and these metals can be used.

It is preferable to use the catalytic metal as fine particles with particle diameters that are small enough in view of increasing the contact area with exhaust gas. The average particle diameter (the average value of particle diameters determined by TEM analysis; the same applies hereinafter) of the catalytic metal particles is usually about 1 nm to 15 nm, preferably 10 nm or smaller, 7 nm or smaller, or even 5 nm or smaller.

The catalytic metals in the two catalytic layers (the first and second catalytic layers $261$ and $262$) may be the same or different.

In a preferable example, the first catalytic layer $261$ comprises rhodium (Rh). With the highly reactive rhodium in the first catalytic layer $261$, an active purification reaction can occur upstream of exhaust gas (in the first catalytic layer $261$). As a result, the heat of the purification reaction can be transferred downstream (to the second catalytic layer $262$) to keep the entire catalyst at high temperatures (keep the catalyst temperature high). Thus, with the limited amounts of catalytic metal(s), the purification performance (especially for $NO_x$) can be effectively enhanced. For instance, this is especially effective in an embodiment where the exhaust gas temperature temporarily falls below the catalyst activation temperature (e.g. in an eco-friendly car in which the engine stops and starts repeatedly when the car makes temporary stops while driving or waiting at traffic lights).

In another favorable example, one catalytic layer comprises a highly reducible metal and the other catalytic layer comprises a highly oxidizing metal. For instance, the first catalytic layer $261$ comprises rhodium (Rh) and the second catalytic layer $262$ comprises palladium (Pd). According to such an embodiment, toxic components of exhaust gas can be efficiently purified at once.

In each catalytic layer, the catalytic metal-carrying rate (the catalytic metal content with the carrier being 100% by mass) is not particularly limited. For instance, it can be decided in view of the lengths and thicknesses of the two catalytic layers $261$ and $262$, the flow rate of the exhaust gas supplied, etc.

In a favorable example, the carrying rate in each catalytic layer is 1.5% by mass or lower; preferably 0.05% by mass or higher, but 1.5% by mass lower; or more preferably 0.2% by mass or higher, but 1% or lower by mass. When the carrying rate is 1.5% by mass or lower, particle growth (sintering) of the metal can be greatly inhibited. As a result, high durability can be obtained. It is also cost-effective. A carrying rate of 0.05% by mass or higher is effective in obtaining excellent catalytic activities.

The catalytic metal-carrying rate of the first catalytic layer $261$ can be the same as or different from that of the second catalytic layer $262$.

Lately, from the standpoint of reducing manufacturing costs, saving resource, etc., reduction of use of catalytic metal(s) (e.g. Rh) tends to be expected. According the art disclosed herein, the effects of the catalytic metals can be obtained with a compromise, and the purification performance (especially for $NO_x$) can be effectively enhanced with limited amounts of catalytic metals. Thus, the art disclosed herein exhibits particularly notable effects when the catalytic metal-carrying rates are low (e.g. 1% by mass or lower).

As the carrier to support the catalytic metal, one, two or more species can be suitably used among inorganic materials similarly used in conventional exhaust gas purification catalysts. In particular, a porous material having a relatively large specific surface area (which refers to a specific surface area determined by the BET method; the same applies hereinafter) is preferable. Favorable examples include alumina ($Al_2O_3$), ceria ($CeO_2$), zirconia ($ZrO_2$), silica ($SiO_2$), titania ($TiO_2$), and solid solutions of these (e.g. a ceria-zirconia composite oxide (CZ composite oxide)). Alumina and a CZ composite oxide are particularly preferable.

From the standpoint of the heat resistance and the structural stability, the carrier (e.g. alumina powder, ZC composite oxide powder) may have a specific surface area of generally about 10 $m^2/g$ to 300 $m^2/g$, for example, 50 $m^2/g$ to 150 $m^2/g$. The carrier may have an average particle diameter of about 0.01 μm to 100 μm, for example, 0.1 μm to 50 μm.

The species of carrier in the two catalytic layers (the first and second catalytic layers 261 and 262) may be the same or different.

In addition to the carrier supporting the catalytic metal, the two catalytic layers (the first and second catalytic layers 261 and 262) may comprise a promoter not carrying a catalytic metal. As the promoter, the species exemplified as the carrier can be considered. As an additional element forming the carrier or as an entity independent from the carrier, the two catalytic layers may further comprise, for instance, an alkali metal, an alkaline earth metal (e.g. barium), a rare earth metal, etc.

In a favorable embodiment, the first catalytic layer 261 and/or the second catalytic layer 262 comprises alumina. The alumina may be included in each catalytic layer as an element forming the catalytic metal-carrying carrier and/or as an element forming the catalytic metal-free promoter.

It is particularly preferable that each of the first and second catalytic layers 261 and 262 comprises alumina. By this, excellent heat resistance and durability can be stably obtained and the effects of this invention can be brought to a higher level.

The alumina content in each catalytic layer (with the total non-volatile content in each catalytic layer being 100% by mass) is not particularly limited. For instance, it can be decided in view of the length and the thickness of each catalytic layer, the flow rate of the supplied exhaust gas, etc.

The alumina content $A_1$ in the first catalytic layer 261 can be the same as or different from the alumina content $A_2$ in the second catalytic layer 262. Preferably, the alumina content $A_2$ of the second catalytic layer 262 is higher than the alumina content $A_1$ of the first catalytic layer 261.

In a favorable example, in the first catalytic layer 261, with the total non-volatile content being 100% by mass, the alumina content $A_1$ is 15% to 50% (preferably 15% to 40%, more preferably 20% to 35%, e.g. 23% to 33%) by mass.

In another favorable example, in the second catalytic layer 262, with the total non-volatile content being 100% by mass, the alumina content $A_2$ is 20% to 65% (preferably 25% to 50%, more preferably 30% to 45%, e.g. 33% to 43%) by mass. In such an embodiment, the aforementioned effects can be better exhibited.

In another favorable embodiment, the first catalytic layer 261 and/or the second catalytic layer 262 comprises cerium. The cerium can be included in each catalytic layer as an element forming the catalytic metal-carrying carrier and/or as an element forming the catalytic metal-free promoter. For instance, it can be included in each catalytic layer as an element forming ceria ($CeO_2$) or a ceria-containing composite oxide (e.g. a ZC composite oxide). A ZC composite oxide is particularly favorable. In the ZC composite oxide, zirconia and ceria form a solid solution, whereby particle growth is inhibited. Thus, with excellent durability, great purification performance can be obtained for a long period. The ratio of zirconia to ceria mixed in the ZC composite oxide can be about zirconia/ceria=8/1 to 5/4 (e.g. 7.5/1.5 to 6.5/2.5).

It is particularly preferable that each of the first and second catalytic layers 261 and 262 comprises cerium. This can bring the effects of this invention to a higher level. Ceria and a ceria-containing composite oxide (e.g. a ZC composite oxide) are effective in stably maintaining the exhaust gas near-stoichiometric (near the theoretical air-fuel ratio) in the catalyst. In other words, it may work as an oxygen storage material (OSC (oxygen storage capacity) material). Thus, stable catalytic performance can be obtained, further increasing the purification performance. As a result, the effects of this invention can be brought to a higher level.

The cerium content in each catalytic layer (with the total non-volatile content in each catalytic layer being 100% by mass) is not particularly limited. For instance, it can be decided in view of the length and the thickness of each catalytic layer, the flow rate of the supplied exhaust gas, etc.

The cerium content $C_1$ in the first catalytic layer 261 can be the same as or different from the cerium content $C_2$ in the second catalytic layer 262. Preferably, the cerium content $C_1$ of the first catalytic layer 261 is higher than the cerium content $C_2$ of the second catalytic layer 262. In such an embodiment, excellent catalytic activities and heat retention can be stably obtained in the first catalytic layer 261.

In a favorable example, in the first catalytic layer 261, with the total non-volatile content being 100% by mass, the cerium content $C_1$ is 5% to 35% (preferably 5% to 30%, more preferably 8% to 24%, e.g. 10% to 22%) by mass.

In another favorable example, in the second catalytic layer 262, with the total non-volatile content being 100% by mass, the cerium content $C_2$ is 2% to 30% (preferably 5% to 25%, more preferably 5% to 20%, e.g. 7.5% to 17.5%) by mass. In such an embodiment, the aforementioned effects can be better exhibited.

In another favorable embodiment, the first catalytic layer 261 and/or the second catalytic layer 262 typically comprises barium (Ba). Especially, when a catalytic layer (e.g. the second catalytic layer 262) comprises palladium, it preferably comprises barium together. This can favorably inhibit HC-poisoning (especially olefin poisoning) and sintering of palladium. Thus, the catalytic function of the exhaust gas purification catalyst can be maintained at a high level.

The barium content is not particularly limited. In a favorable example, with the total non-volatile content of the palladium-containing catalytic layer (e.g. the second catalytic layer 262) being 100% by mass, the barium content is 12% or less (preferably 3% to 9%, e.g. 4% to 8%) by mass. In such an embodiment, the aforementioned effects can be better exhibited.

The barium can be included in each catalytic layer, for instance, as an element forming the catalytic metal-carrying carrier and/or the catalytic metal-free promoter. Thus, the form of the barium is not particularly limited. In an embodiment, it can be included in each catalytic layer as a compound such as barium sulfate, barium acetate, and barium carbonate. For instance, when barium sulfate is used, with the total non-volatile content of the palladium-containing catalytic layer (e.g. the second catalytic layer 262) being 100% by mass, the barium sulfate content can be 20% or less (preferably 5% to 15%, e.g. 7% to 13%) by mass. In such an embodiment, the aforementioned effects can be better exhibited.

The average catalyst coating density $D_A$ of exhaust gas purification catalyst 10 at large is not particularly limited. It can be generally about 40 g/L to 150 g/L. When the average catalyst coating density $D_A$ is 150 g/L or lower, or preferably 120 g/L or lower, for instance, 100 g/L or lower, the pressure loss of exhaust gas purification catalyst 10 at large can be inhibited to a greater extent. When the average catalyst coating density $D_A$ is 40 g/L or higher, or preferably 50 g/L or higher, for instance, 60 g/L or higher, greater purification performance can be obtained. Thus, the effects of this invention can be brought to a higher level.

The coating density $D_1$ of the first catalytic layer 261 can be decided in view of the length and the thickness of the first catalytic layer 261 as well as the properties (e.g. the shape of cells, the total thickness of a partition wall, the porosity) of the substrate. In a favorable example, from the standpoint of reducing the pressure loss, the coating density $D_1$ in the first catalytic layer 261 is generally 80 g/L or lower, or preferably 70 g/L or lower. In another favorable example, from the standpoint of enhancing the purification performance upstream of exhaust gas (in the vicinity of the exhaust inlet-side end 24a in the miming direction of the partition wall), the coating density $D_1$ in the first catalytic layer 261 is generally 50 g/L or higher, or preferably 60 g/L or higher. By this, the pressure loss can be reduced while obtaining greater catalytic performance.

The coating density $D_2$ of the second catalytic layer 262 can be decided in view of the length and the thickness of the second catalytic layer 262 as well as the properties (e.g. the shape of cells, the total thickness of a partition wall, the porosity) of the substrate. In a favorable example, from the standpoint of reducing the pressure loss, the coating density $D_2$ in the second catalytic layer 262 is generally 60 g/L or lower, or preferably 50 g/L or lower. In another favorable example, the coating density $D_2$ in the second catalytic layer 262 is generally 40 g/L or higher, or preferably 45 g/L or higher. By this, the pressure loss can be reduced while obtaining greater catalytic performance.

The coating densities of the two catalytic layers (the first and second catalytic layers 261 and 262) can be the same or different.

In a preferable embodiment, the second catalytic layer 262 has a higher coating density than the first catalytic layer 261. In particular, the ratio ($D_1/D_2$) of the coating density $D_1$ of the first catalytic layer 261 to the coating density $D_2$ of the second catalytic layer 262 can be 1.3 to 1.6 (e.g. 1.3 to 1.4). In other words, the coating density $D_1$ of the first catalytic layer 261 is 1.3 times to 1.6 times (e.g. 1.3 times to 1.4 times) the coating density $D_2$ of the second catalytic layer 262. This can combine reduction of pressure loss in exhaust gas purification catalyst at large with enhancement of purification performance at a higher level.

When $1.3 \leq D_1/D_2$ is satisfied, the pressure loss in the first catalytic layer 261 increases. This makes where the first catalytic layer 261 is formed in partition wall 26 less permeable to exhaust gas. Thus, upon entering entrance cell 24 via the exhaust inlet-side end 24a, exhaust gas is more likely to flow straight up through entrance cell 24 to where the first catalytic layer 261 is not formed. The exhaust gas linearly flowing through entrance cell 24 prefers to pass through where the first catalytic layer 261 is not formed (typically where solely the second catalytic layer 262 is formed) to reach exit cell 26. As a result, the exhaust gas flows smoothly from entrance cell 24 to exit cell 25, whereby the pressure loss of exhaust gas purification catalyst 10 at large can be reduced. However, when the difference in volume of flowing exhaust gas between the two catalytic layers 261 and 262 is excessively large, the exhaust gas is caused to quickly pass through partition wall 26. When $D_1/D_2 \leq 1.6$ is satisfied, excellent purification performance can be stably achieved.

Such catalytic layers can be formed by the same methods as in the conventional art. For instance, two catalytic layers (the first and second catalytic layers 261 and 262) as shown in FIG. 3 can be formed as follows:

First, a substrate as shown in FIGS. 1 and 2 is obtained. Two different catalytic layer-forming slurries (i.e. a first catalytic layer-forming slurry and a second catalytic layer-forming slurry) are then prepared. Each catalytic layer-forming slurry comprises a desirable catalytic metal component (typically a solution containing ions of a catalytic metal such as Pd, Pt, and Rh) and desirable carrier powder (typically, an OSC material such as alumina and ceria) as essential components and may further comprise other optional components (e.g. an OSC material and binder as promoters, various additives, etc.). The properties (viscosity, non-volatile content, etc.) of the slurry can be adjusted in view of the dimensions of the substrate used, the properties (porosity, etc.) of partition wall 26, the properties of the catalytic layer to be formed, etc.

Subsequently, the prepared first catalytic layer-forming slurry is supplied via the exhaust inlet-side end 24a of the substrate up to the length $L_1$ in the running direction into entrance cell 24; it is then dried and calcined. This forms the first catalytic layer 261 with desirable properties in pores of partition wall 26 in contact with entrance cell 24. The properties (e.g. coating density $D_1$, porosity) of the first catalytic layer 261 can be adjusted by the properties, the supplied amount and the number of supplies of the first catalytic layer-forming slurry, etc. For instance, to increase the coating density $D_1$, it is effective to increase the viscosity, the non-volatile content, and the supplied amount of the slurry as well as to supply the slurry several times. The thickness $T_1$ of the first catalytic layer 261 can be adjusted by the supply time of the slurry, by applying pressure to exit cell 25 when supplying the slurry so as to create a pressure gradient between entrance cell 24 and exit cell 25, etc. The slurry can be supplied, dried, and calcined in the same manner as in the conventional catalytic layer formation.

The second catalytic layer-forming slurry prepared above is then supplied via the exhaust outlet-side end 25a of the substrate up to the length $L_2$ in the running direction into exit cell 25; it is then dried and calcined. This forms the second catalytic layer 262 with desirable properties in pores of partition wall 26 in contact with exit cell 25. The properties (e.g. coating density $D_2$, porosity) and the thickness $T_2$ of the second catalytic layer 262 can be adjusted in the same manner as in the formation of the first catalytic layer 261, by the properties, the supplied amount, the number of supplies, and the supply time of the second catalytic layer-forming slurry as well as a pressure gradient created between entrance cell 24 and exit cell 25, etc.

By this, two catalytic layers (the first and second catalytic layers 261 and 262) can be formed as shown in FIG. 3.

When compared to the conventional art, the exhaust gas purification catalyst 10 disclosed herein may be able to combine reduction of pressure loss and enhancement of purification performance ($NO_x$ purification performance) at a high level. Accordingly, it can be favorably placed in an exhaust system (exhaust pipe) of, for instance, a gasoline engine or a diesel engine of an automobile.

Described below are Examples related to the present invention. The present invention is not, however, limited to these specific Examples.

In the experiments below, the coating lengths $L_1$ and $L_2$ in the miming direction are shown as the relative values (%) with the total length $L_w$ of a partition wall being 100%. Similarly, the thicknesses $T_1$ and $T_2$ are shown as the relative values (%) with the total thickness $T_w$ of a partition wall being 100%.

As honeycomb substrates, were obtained cordierite wall-flow substrates having a shape as shown in FIGS. 1 and 2.

The second catalytic layer-forming slurry was then supplied into exit cells via exhaust outlet-side ends of honeycomb substrates, dried, and calcined to form second catalytic layers in some pores in internal portions of partition walls in contact with exit cells. Here, the second catalytic layers were formed, differing solely in coating length $L_1$ in the running direction as shown in Table 1.

Exhaust gas purification catalysts (Reference Example 1, Examples 1 to 5) were thus obtained.

The features of the catalytic layers are summarized in Table 1 below.

TABLE 1

Studies on lengths of substrate-exposing segment and catalytic layers

| | First catalytic layer | | | | Second catalytic layer | | | | Subst. seg. | | Test results | |
| --- | --- | --- | --- | --- | --- | --- | --- | --- | --- | --- | --- | --- |
| | $M_{CAT}$ | $L_1$ (%) | Amt of coating (g) | $T_1$ (%) | $M_{CAT}$ | $L_2$ (%) | Amt of coating (g) | $T_2$ (%) | $L_3$ (%) | $T_3$ (%) | Ratio of pressure loss* | $NO_x$ $T_{50}$ (° C.)* |
| Ref. Ex. 1 | Rh | 100 | 60.2 | 50 | Pd | 100 | 28.3 | 50 | — | 50 | 1 | (Std) |
| Ex. 1 | Rh | 53 | 60.2 | 50 | Pd | 45 | 28.3 | 50 | 47 | | 0.61 | −9.9 |
| Ex. 2 | | 62 | | | | | | | 38 | | 0.36 | −14.3 |
| Ex. 3 | | 70 | | | | | | | 30 | | 0.40 | −10.0 |
| Ex. 4 | | 77 | | | | | | | 23 | | 0.34 | −11.6 |
| Ex. 5 | | 87 | | | | | | | 13 | | 0.60 | −16.2 |

$M_{CAT}$: Catalytic metal
*Relative ratio or difference with the data of Ref. Ex. 1 being the standard Each honeycomb substrate is overall 122 mm long, 118 mm in outer diameter, 1.3 L in capacity, 300 cpsi (number of cells per square inch), 20 μm in average pore diameter of partition wall, and 65% porosity of partition wall. Using the honeycomb substrates, the following studies (I to X) were conducted with respect to arrangement and properties of catalytic layers.

[Study I. Lengths of Substrate-Exposing Segment and Catalytic Layers]

First, were mixed 18 g of alumina powder (γ-$Al_2O_3$), a zirconia-ceria composite oxide powder (zirconia/ceria=7/2) in an amount to yield 42 g of ZC composite oxide ($ZrO_2$—$CeO_2$) upon calcination, rhodium nitrate with 0.2 g Rh content, and a suitable amount of ion-exchanged water. The resulting mixture was dried and then calcined (at 500° C. for one hour) to obtain a Rh-carrying powder. Were mixed the resulting powder and ion-exchanged water to prepare a first catalytic layer-forming slurry.

The first catalytic layer-forming slurry was then supplied into the entrance cells via the exhaust inlet-side ends of the honeycomb substrates, dried at 150° C. for one hour, and calcined at 500° C. for one hour to form the first catalytic layers in some pores in internal portions of the partition walls in contact with the entrance cells. Here, the first catalytic layers were formed, differing solely in coating length $L_1$ in the running direction as shown in Table 1.

Were then mixed 10 g of alumina powder (γ-$Al_2O_3$), a zirconia-ceria composite oxide powder (zirconia/ceria=7/2) in an amount to yield 15 g of ZC composite oxide ($ZrO_2$—$CeO_2$) upon calcination, 2.5 g of barium sulfate, palladium nitrate with 0.8 g Pd content, and a suitable amount of ion-exchanged water. The resulting mixture was dried and then calcined (at 500° C. for one hour) to obtain a powder of Pd-carrying $Al_2O_3$ and ZC composite oxide. Were mixed the resulting powder and ion-exchanged water to prepare a second catalytic layer-forming slurry.

<Evaluation of Rate of Increase of Pressure Loss>

With respect to the exhaust gas purification catalysts, ratios of pressure loss were determined. In particular, a reference honeycomb substrate prior to coating of catalytic layers was obtained. While a stream of air was passed through at 7 m³/min, the pressure was measured. Subsequently, using each exhaust gas purification catalyst (each honeycomb substrate with catalytic layers) fabricated above, the pressure was measured while a stream of air was passed through, similarly to the reference. The rate (%) of increase of pressure loss was determined by the next expression [(pressure of exhaust gas purification catalyst−pressure of reference)/pressure of reference]×100. The results are shown in Table 1. Table 1 shows the relative ratios to the rate of increase of pressure loss of one Example, that is, the relative ratios of pressure loss with the rate of increase of pressure loss of the one Example being the standard (1). The smaller the value is (the greater the decreased value is), the smaller the increase in pressure loss is.

<Exhaust Gas Performance Test>

Each of the resulting exhaust gas purification catalysts was installed in a gasoline engine exhaust pipe. The exhaust gas purification performance was compared under temperature elevation. In particular, the exhaust gas purification catalyst was placed in the exhaust system of an engine bench. Using a heat exchanger, the catalyst entrance gas temperature was increased at 50° C./min from 150° C. During this, from the catalyst entrance gas concentration and exit gas concentration, was determined the temperature ($NO_x$_$T_{50}$) corresponding to 50% purification of $NO_x$ under temperature elevation. The results are shown in the corresponding column in Table 1. In Table 1, the differences from the $NO_x$_$T_{50}$ value of one Example are shown, that is, the relative differences with the $NO_x$_$T_{50}$ value of the one Example being the standard. The smaller the value is (the greater the decreased value is), the greater the purification performance is with low $NO_x\_T_{50}$.

Figure 4:
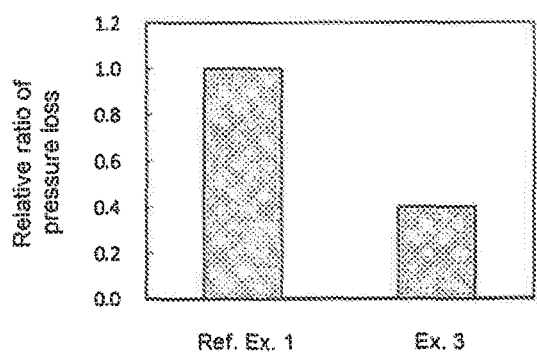
FIG. 4 is a comparison chart showing the ratios of pressure loss of Example 3 and Reference Example 1.

FIG. 4 is a comparison chart showing the ratios of pressure loss of Example 3 and Reference Example 1. As evident from Table 1 and FIG. 4, in Example 3 according to this invention, the ratio of pressure loss is lower than Reference Example 1. One reason for the higher ratio of pressure loss of Reference Example 1 can be that with the two catalytic layers overlapping in the running direction over the entire length of the substrate, pores (i.e. gas flow channels) in the partition walls were in a closed state. On the other hand, it is presumed that the closed state of gas flow channels was resolved in Example 3, whereby the ratio of pressure loss decreased.

Figure 5:
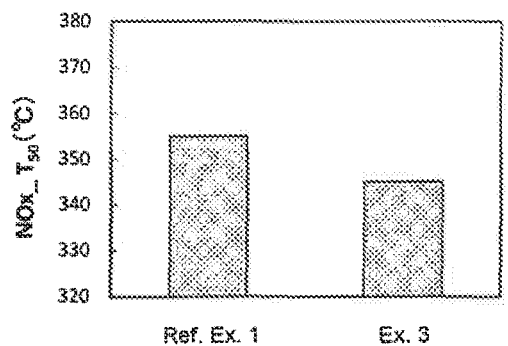
FIG. 5 is a comparison chart showing the exhaust gas purification performance ($NO_x\_T_{50}$) of Example 3 and Reference Example 1.

FIG. 5 is a comparison chart of the exhaust gas purification performance (the absolute values of $NO_x\_T_{50}$) of Example 3 and Reference Example 1. As evident from Table 1 and FIG. 5, the purification performance increased in Example 3 according to this invention as compared to Reference Example 1. This can be because the two catalytic layers had higher precious metal densities.

Figure 6:
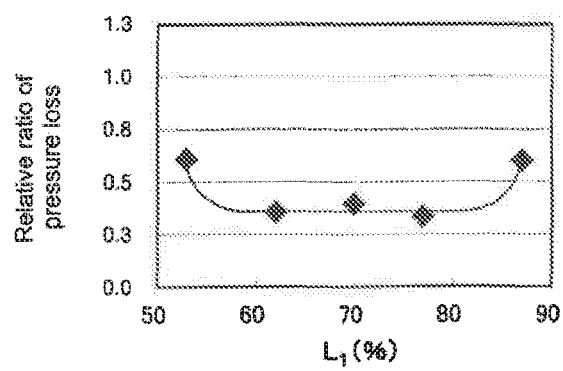
FIG. 6 is a plot showing the relationship of the first catalytic layer's length $L_1$ and the ratio of pressure loss.
Figure 7:
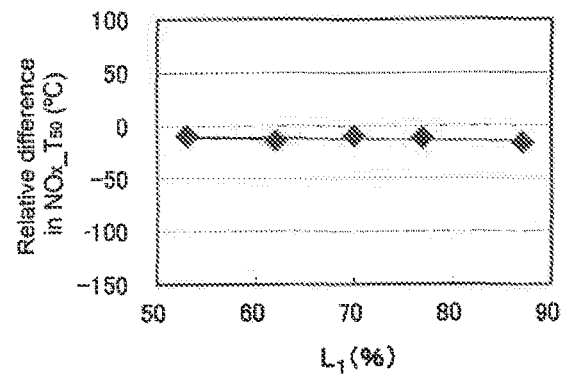
FIG. 7 is a plot showing the relationship of the first catalytic layer's length $L_1$ and the exhaust gas purification performance ($NO_x\_T_{50}$).

FIG. 6 is a plot showing the relationship of the first catalytic layer's length $L_1$ and the ratio of pressure loss. FIG. 7 is a plot showing the relationship of the first catalytic layer's length $L_1$ and the exhaust gas purification performance ($NO_x\_T_{50}$).

With increasing length $L_1$ of the first catalytic layer, the length $L_3$ of the substrate-exposing segment decreases. The overlap of the first and second catalytic layers in the running direction increases as well. Thus, with more closed gas flow channels, the pressure loss tends to increase. On the other hand, in the present Examples, because the coating amounts are constant, with decreasing length $L_1$ of the first catalytic layer, the coating density in the interior of the partition walls increases. Accordingly, gas flow channels are closed, whereby the pressure loss tends to increase. As evident from Table 1, FIGS. 6 and 7, when the length $L_3$ of the substrate-exposing segment satisfies $0.2L_w \leq L_1 \leq 0.4L_w$ (e.g. $0.23L_w \leq L_3 \leq 0.38L_w$), in other words, when the first catalytic layer's length $L_1$ satisfies $0.6L_w \leq L_1 \leq 0.8L_w$ (e.g. $0.62L_w \leq L_1 \leq 0.77L_w$), reduction of pressure loss in exhaust gas purification catalyst at large can be combined with enhancement of purification performance at a higher level.

[Study II. Catalytic Layer Overlap in Running Direction]

In these Examples, were used the same catalytic layer-forming slurries as in Study I. Using these slurries, based on Study I, were formed the first and second catalytic layers as shown in Table 2, differing solely in coating lengths $L_1$ and $L_2$ in the running direction. The pressure loss and the exhaust gas purification performance were evaluated, similarly to Study I. Similarly to Study I, the pressure loss and the exhaust gas purification performance were evaluated. The results are shown in the corresponding column in Table 2. In Table 2, "Overlap L (%)" shows the percentage (%) of the length of an overlap between $L_1$ and $L_2$ with the total length $L_w$ of a partition wall in the running direction being 100%. A negative value indicates that there is a space between the first and second catalytic layers in the running direction.

TABLE 2

Studies on overlap of catalytic layers in running direction

| | First catalytic layer | | | | Second catalytic layer | | | Subst. seg. | | Over-lap | Test results | |
| | | | | | | | | | | | Ratio of | $NO_x$ |
| | $M_{CAT}$ | $L_1$ (%) | Amt of coating (g) | $T_1$ (%) | $M_{CAT}$ | $L_2$ (%) | Amt of coating (g) | $T_2$ (%) | $L_3$ (%) | $T_3$ (%) | L (%) | pressure loss* | $T_{50}$ (° C.)* |
|---|---|---|---|---|---|---|---|---|---|---|---|---|---|
| Ex. 6 | Rh | 30 | 60.2 | 50 | Pd | 30 | 28.3 | 50 | 70 | 50 | −40 | 1 | (Std) |
| Ex. 7 | | 63 | | | | 38 | | | 37 | | 1 | 2.36 | −67.8 |
| Ex. 8 | | 70 | | | | 45 | | | 30 | | 15 | 1.63 | −69.0 |
| Ex. 9 | | 77 | | | | 52 | | | 23 | | 29 | 1.39 | −70.6 |
| Ex. 10 | | 80 | | | | 80 | | | 20 | | 60 | 16.79 | −66.1 |

Figure 8:
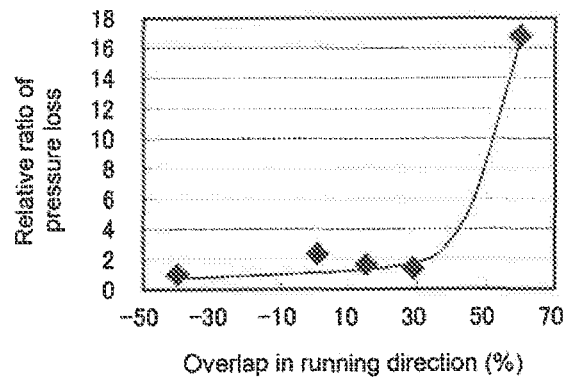
FIG. 8 is a plot showing the relationship of the catalytic layer overlap in the running direction and the ratio of pressure loss.
Figure 9:
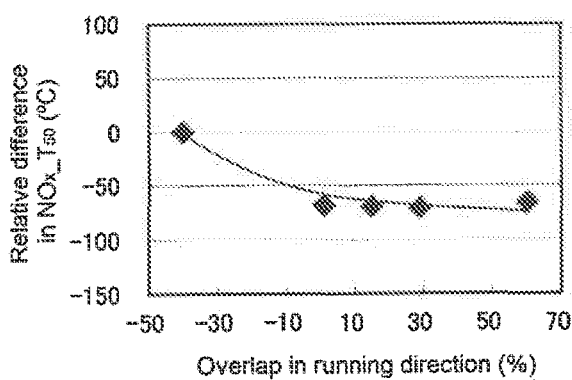
FIG. 9 is a plot showing the relationship of the catalytic layer overlap in the running direction and the exhaust gas purification performance ($NO_x\_T_{50}$).

$M_{CAT}$: Catalytic metal
*Relative ratio or difference with the data of Ex. 6 being the standard FIG. 8 is a plot showing the relationship of the catalytic layer overlap in the running direction and the ratio of pressure loss. FIG. 9 is a plot showing the relationship of the catalytic layer overlap in the running direction and the exhaust gas purification performance ($NO_x\_T_{50}$).

As evident from FIG. 8, with increasing overlap between the first and second catalytic layers, the closed part of gas flow channels increases, thereby increasing the pressure loss. On the other hand, as evident from FIG. 9, in absence of an overlap between the first and second catalytic layers, exhaust gas passes through areas with no catalytic layers, leading to poor purification performance. Based on the above, when the overlap between the lengths $L_1$ and $L_2$ of the first and second catalytic layers is 0.5% to 30% of the total length $L_w$ of a partition wall in the running direction, that is, when $1.005L_w \leq (L_1+L_2) \leq 1.3L_w$ (e.g. $1.01L_w \leq (L_1+L_2) \leq 1.29L_w$) is satisfied, reduction of pressure loss in exhaust gas purification catalyst at large can be combined with enhancement of purification performance at a higher level.

[Study III. Coating Densities of Catalytic Layers]

In these Examples, the materials listed below were used to prepare catalytic layer-forming slurries. Otherwise, based on Study I, were formed the first and second catalytic layers as shown in Table 3, differing solely in coating amounts (coating densities). The pressure loss and the exhaust gas purification performance were evaluated, similarly to Study I. The pressure loss and the exhaust gas purification performance were evaluated, similarly to Study I. The results are shown in the corresponding column in Table 3.

Example 11

First catalytic layer-forming slurry: 15.5 g alumina powder, 36.1 g zirconia-ceria composite oxide powder (zirconia/ceria=7/2), rhodium nitrate (0.2 g Rh)

Second catalytic layer-forming slurry: 11.4 g alumina powder, 17.2 g zirconia-ceria composite oxide powder (zirconia/ceria=7/2), 2.9 g barium sulfate, palladium nitrate (0.8 g Pd)

Example 12

First catalytic layer-forming slurry: 17.5 g alumina powder, 40.7 g zirconia-ceria composite oxide powder (zirconia/ceria=7/2), rhodium nitrate (0.2 g Rh)
Second catalytic layer-forming slurry: 10.2 g alumina powder, 15.3 g zirconia-ceria composite oxide powder (zirconia/ceria=7/2), 2.6 g barium sulfate, palladium nitrate (0.8 g Pd)

Example 13

First catalytic layer-forming slurry: 18 g alumina powder, 42 g zirconia-ceria composite oxide powder (zirconia/ceria=7/2), rhodium nitrate (0.2 g Rh)
Second catalytic layer-forming slurry: 10 g alumina powder, 15 g zirconia-ceria composite oxide powder (zirconia/ceria=7/2), 2.5 g barium sulfate, palladium nitrate (0.8 g Pd)

Example 14

First catalytic layer-forming slurry: 18.9 g alumina powder, 44.1 g zirconia-ceria composite oxide powder (zirconia/ceria=7/2), rhodium nitrate (0.2 g Rh)
Second catalytic layer-forming slurry: 9.5 g alumina powder, 14.3 g zirconia-ceria composite oxide powder (zirconia/ceria=7/2), 2.3 g barium sulfate, palladium nitrate (0.8 g Pd)

Example 15

First catalytic layer-forming slurry: 19.8 g alumina powder, 46.3 g zirconia-ceria composite oxide powder (zirconia/ceria=7/2), rhodium nitrate (0.2 g Rh)
Second catalytic layer-forming slurry: 9.0 g alumina powder, 13.5 g zirconia-ceria composite oxide powder (zirconia/ceria=7/2), 2.2 g barium sulfate, palladium nitrate (0.8 g Pd)

Figure 10:
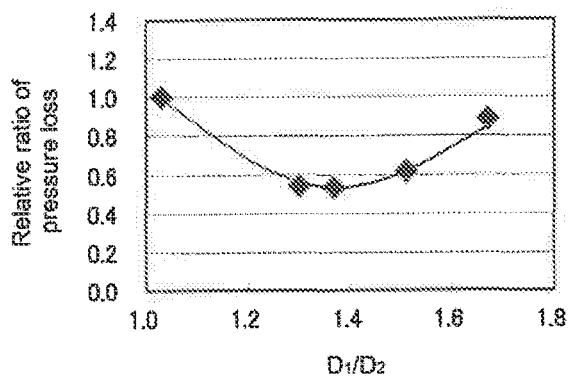
FIG. 10 is a plot showing the relationship of the coating density ratio ($D_1/D_2$) and the ratio of pressure loss.
Figure 11:
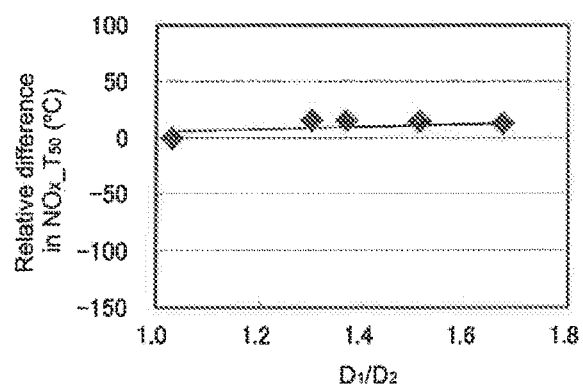
FIG. 11 is a plot showing the relationship of the coating density ratio ($D_1/D_2$) and the exhaust gas purification performance ($NO_x\_T_{50}$).

FIG. 10 is a plot showing the relationship of the coating density ratio ($D_1/D_2$) and the ratio of pressure loss. FIG. 11 is a plot showing the relationship of the coating density ratio ($D_1/D_2$) and the exhaust gas purification performance ($NO_x\_T_{50}$).

As evident from FIGS. 10 and 11, when the coating density ratio ($D_1/D_2$) is 1.3 to 1.6 (e.g. $1.30 \leq D_1/D_2 \leq 1.51$), reduction of pressure loss in exhaust gas purification catalyst at large can be combined with enhancement of purification performance at a higher level. In other words, by varying the coating densities $D_1$ and $D_2$ of the first and second catalytic layers, exhaust gas can be led to where the first catalytic layer is not formed in the partition wall. As a result, exhaust gas flows smoothly with reduced pressure loss. When $D_1$ and $D_2$ approach uniformity, the effects decrease, thereby increasing the pressure loss.

[Study IV. Alumina Content of First Catalytic Layer]

In these Examples, the materials listed below were used to prepare the first catalytic layer-forming slurry; the same second catalytic layer-forming slurry as in Study I. was used for all. Otherwise, based on Study I, were formed the first and second catalytic layers as shown in Table 4, differing solely in alumina content of the first catalytic layer. The pressure loss and the exhaust gas purification performance were evaluated, similarly to Study I. The results are shown in the corresponding column in Table 4.

Example 16

First catalytic layer-forming slurry: 7 g alumina powder, 53 g zirconia-ceria composite oxide powder (zirconia/ceria=7/2), rhodium nitrate (0.2 g Rh)

Example 17

First catalytic layer-forming slurry: 10 g alumina powder, 50 g zirconia-ceria composite oxide powder (zirconia/ceria=7/2), rhodium nitrate (0.2 g Rh)

Example 18

First catalytic layer-forming slurry: 18 g alumina powder, 42 g zirconia-ceria composite oxide powder (zirconia/ceria=7/2), rhodium nitrate (0.2 g Rh)

TABLE 3

Studies on coating densities of catalytic layers

| | First catalytic layer | | | | Second catalytic layer | | | | Test results | |
|---|---|---|---|---|---|---|---|---|---|---|
| | | | Amt of coating | | | | Amt of coating | | | |
| | $M_{CAT}$ | $L_1$ (%) | (g) $D_1$ (g/L) | $T_1$ (%) | $M_{CAT}$ | $L_2$ (%) | (g) $D_2$ (g/L) | $T_2$ (%) | $D_1/D_2$ | Ratio of pressure loss* | $NO_x$ $T_{50}$ (° C.)* |
| Ex. 11 | Rh | 70 | 51.8 / 56.9 | 50 | Pd | 45 | 32.3 / 55.2 | 50 | 1.03 | 1 | (Std) |
| Ex. 12 | | | 58.4 / 64.2 | | | | 28.9 / 49.4 | | 1.30 | 0.54 | 15.4 |
| Ex. 13 | | | 60.2 / 66.2 | | | | 28.3 / 48.4 | | 1.37 | 0.54 | 15.3 |
| Ex. 14 | | | 63.2 / 67.5 | | | | 26.9 / 46.0 | | 1.51 | 0.62 | 14.5 |
| Ex. 15 | | | 66.3 / 72.9 | | | | 25.5 / 43.6 | | 1.67 | 0.89 | 12.7 |

$M_{CAT}$: Catalytic metal
*Relative ratio or difference with the data of Ex. 11 being the standard

Example 19

First catalytic layer-forming slurry: 29 g alumina powder, 31 g zirconia-ceria composite oxide powder (zirconia/ceria=7/2), rhodium nitrate (0.2 g Rh)

Example 20

First catalytic layer-forming slurry: 32 g alumina powder, 28 g zirconia-ceria composite oxide powder (zirconia/ceria=7/2), rhodium nitrate (0.2 g Rh)

Example 23

First catalytic layer-forming slurry: 18 g alumina powder, 42 g zirconia-ceria composite oxide powder (zirconia/ceria=8/1), rhodium nitrate (0.2 g Rh)

Example 24

First catalytic layer-forming slurry: 18 g alumina powder, 42 g zirconia-ceria composite oxide powder (zirconia/ceria=7.5/1.5), rhodium nitrate (0.2 g Rh)

TABLE 4

Studies on alumina content of first catalytic layer

| | First catalytic layer | | | | | Second catalytic layer | | | | | Test results | |
|---|---|---|---|---|---|---|---|---|---|---|---|---|
| | $M_{CAT}$ | $L_1$ (%) | Amt of coating (g) | $A_1$ (%) | $T_1$ (%) | $M_{CAT}$ | $L_2$ (%) | Amt of coating (g) | $A_2$ (%) | $T_2$ (%) | Ratio of pressure loss* | $NO_x$ $T_{50}$ (° C.)* |
| Ex. 16 | Rh | 70 | 60.2 | 11.6 | 50 | Pd | 45 | 28.3 | 35.3 | 50 | 1 | (Std) |
| Ex. 17 | | | | 16.6 | | | | | | | 0.98 | −20.6 |
| Ex. 18 | | | | 29.9 | | | | | | | 1.00 | −25.3 |
| Ex. 19 | | | | 48.2 | | | | | | | 1.23 | −20.5 |
| Ex. 20 | | | | 53.2 | | | | | | | 1.54 | −20.3 |

Figure 12:
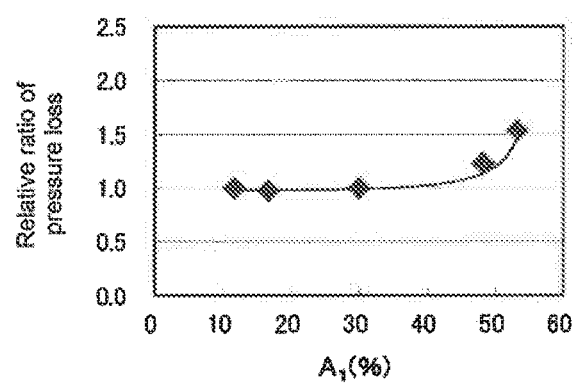
FIG. 12 is a plot showing the relationship of the alumina content $A_1$ of the first catalytic layer and the ratio of pressure loss.
Figure 13:
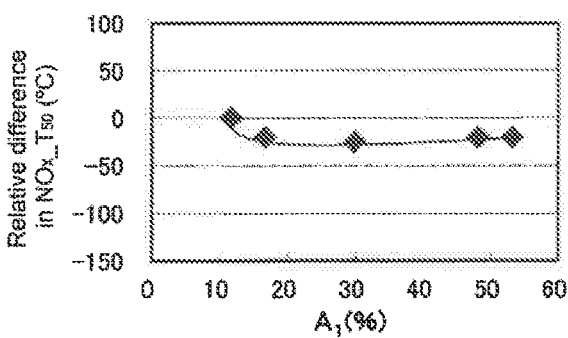
FIG. 13 is a plot showing the relationship of the alumina content $A_1$ of the first catalytic layer and exhaust gas purification performance ($NO_x\_T_{50}$).

$M_{CAT}$: Catalytic metal
*Relative ratio or difference with the data of Ref. Ex. 16 being the standard FIG. 12 is a plot showing the relationship of the alumina content $A_1$ of the first catalytic layer and the ratio of pressure loss. FIG. 13 is a plot showing the relationship of the alumina content $A_1$ of the first catalytic layer and exhaust gas purification performance ($NO_x$ $T_{50}$).

In general, as compared to other materials, alumina tends to have high heat resistance, but a low bulk density. Thus, a high alumina content tends to increase the pressure loss; reversely, a low alumina content tends to cause degradation of purification performance. As evident from FIGS. 12 and 13, with the total non-volatile content of the first catalytic layer being 100% by mass, when the alumina content $A_1$ is 15% to 50% (e.g. 16.6% to 48.2%) by mass, reduction of pressure loss in exhaust gas purification catalyst at large can be combined with enhancement of purification performance at a higher level.

[Study V. Cerium Content of First Catalytic Layer]

In these Examples, the materials listed below were used to prepare the first catalytic layer-forming slurry; the same second catalytic layer-forming slurry as in Study I. was used for all. Otherwise, based on Study I, were formed the first and second catalytic layers as shown in Table 5, differing solely in cerium content of the first catalytic layer. The pressure loss and the exhaust gas purification performance were evaluated, similarly to Study I. The results are shown in the corresponding column in Table 5.

Example 21

First catalytic layer-forming slurry: 29 g alumina powder, 31 g zirconia-ceria composite oxide powder (zirconia/ceria=8.5/0.5), rhodium nitrate (0.2 g Rh)

Example 22

First catalytic layer-forming slurry: 29 g alumina powder, 31 g zirconia-ceria composite oxide powder (zirconia/ceria=8/1), rhodium nitrate (0.2 g Rh)

Example 25

First catalytic layer-forming slurry: 18 g alumina powder, 42 g zirconia-ceria composite oxide powder (zirconia/ceria=7/2), rhodium nitrate (0.2 g Rh)

Example 26

First catalytic layer-forming slurry: 18 g alumina powder, 42 g zirconia-ceria composite oxide powder (zirconia/ceria=6.5/2.5), rhodium nitrate (0.2 g Rh)

Example 27

First catalytic layer-forming slurry: 18 g alumina powder, 42 g zirconia-ceria composite oxide powder (zirconia/ceria=5/4), rhodium nitrate (0.2 g Rh)

Example 28

First catalytic layer-forming slurry: 10 g alumina powder, 50 g zirconia-ceria composite oxide powder (zirconia/ceria=5/4), rhodium nitrate (0.2 g Rh)

Example 29

First catalytic layer-forming slurry: 10 g alumina powder, 50 g zirconia-ceria composite oxide powder (zirconia/ceria=3/6), rhodium nitrate (0.2 g Rh)

TABLE 5

Studies on cerium content of first catalytic layer

| | First catalytic layer | | | | | Second catalytic layer | | | | Test results | |
|---|---|---|---|---|---|---|---|---|---|---|---|
| | $M_{CAT}$ | $L_1$ (%) | Amt of coating (g) | $C_1$ (%) | $T_1$ (%) | $M_{CAT}$ | $L_2$ (%) | Amt of coating (g) | $C_2$ (%) | $T_2$ (%) | Ratio of pressure loss* | $NO_x$ $T_{50}$ (° C.)* |
| Ex. 21 | Rh | 70 | 60.2 | 2.6 | 50 | Pd | 45 | 28.3 | 10.6 | 50 | 1 | (Std) |
| Ex. 22 | | | | 5.1 | | | | | | | 1.02 | −13.0 |
| Ex. 23 | | | | 7.0 | | | | | | | 0.91 | −10.0 |
| Ex. 24 | | | | 10.5 | | | | | | | 0.87 | −18.8 |
| Ex. 25 | | | | 14.0 | | | | | | | 0.81 | −20.0 |
| Ex. 26 | | | | 17.4 | | | | | | | 0.93 | −21.9 |
| Ex. 27 | | | | 27.9 | | | | | | | 0.97 | −15.0 |
| Ex. 28 | | | | 33.2 | | | | | | | 0.83 | −8.0 |
| Ex. 29 | | | | 49.8 | | | | | | | 0.81 | 20.0 |

Figure 14:
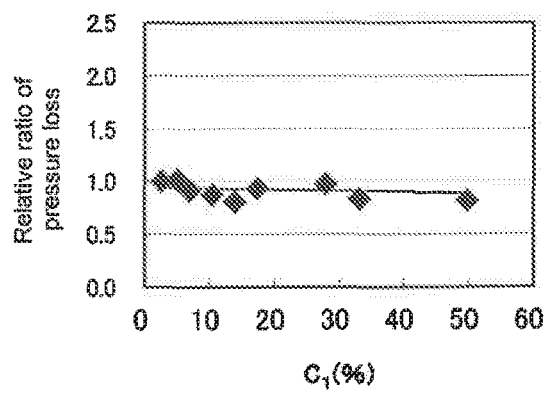
FIG. 14 is a plot showing the relationship of the ceria content $C_1$ of the first catalytic layer and the ratio of pressure loss.
Figure 15:
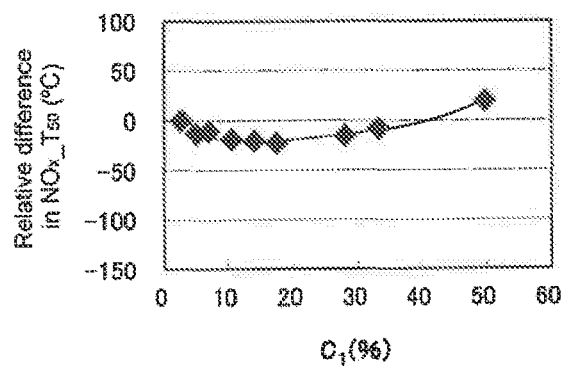
FIG. 15 is a plot showing the relationship of the ceria content $C_1$ of the first catalytic layer and exhaust gas purification performance ($NO_x\_T_{50}$).

$M_{CAT}$: Catalytic metal
*Relative ratio or difference with the data of Ref. Ex. 21 being the standard FIG. 14 is a plot showing the relationship of the ceria content $C_1$ of the first catalytic layer and the ratio of pressure loss. FIG. 15 is a plot showing the relationship of the ceria content $C_1$ of the first catalytic layer and exhaust gas purification performance ($NO_{x\_}T_{50}$).

As evident from FIGS. 14 and 15, with the total non-volatile content of the first catalytic layer being 100% by mass, when the cerium content $C_1$ is 5% to 35% (e.g. 5.1% to 33.2%) by mass, reduction of pressure loss in exhaust gas purification catalyst at large can be combined with enhancement of purification performance at a higher level.

[Study VI. Thicknesses of Substrate-Exposing Segment and Catalytic Layers]

In these Examples, were used the same catalytic layer-forming slurries as in Study I. Using these slurries, based on Study I, were formed the first and second catalytic layers as shown in Table 6, differing in thicknesses $T_1$ and $T_2$ with the total thickness $T_w$ of a partition wall being 100%. The pressure loss and the exhaust gas purification performance were evaluated, similarly to Study I. The results are shown in the corresponding column in Table 6.

In Table 6, a negative coating thickness value (Ref. Ex. 2) indicates that the catalytic layer is deposited on the partition walls (the surface of partition walls), but not in the interior of partition wall. "Overlap T (%)" shows the percentage (%) of the thickness of an overlap between $T_1$ and $T_2$ with the total thickness $T_w$ of a partition wall being 100%. When the value is zero, there is contact, but no overlap in thickness between the two catalytic layers. A negative value indicates that there is a space between the first and second catalytic layers in the thickness direction.

TABLE 6

Studies on thicknesses of substrate-exposing segment and catalytic layers

| | First catalytic layer | | | | Second catalytic layer | | | | Subst. seg. | | Over-lap | Test results | |
|---|---|---|---|---|---|---|---|---|---|---|---|---|---|
| | $M_{CAT}$ | $L_1$ (%) | Amt of coating (g) | $T_1$ (%) | $M_{CAT}$ | $L_2$ (%) | Amt of coating (g) | $T_2$ (%) | $L_3$ (%) | $T_3$ (%) | T (%) | Ratio of pressure loss* | $NO_x$ $T_{50}$ (° C.)* |
| Ex. 30 | Rh | 70 | 60.2 | 30 | Pd | 45 | 28.3 | 30 | 30 | 70 | −40 | 1 | (Std) |
| Ex. 31 | | | | 40 | | | | 40 | | 60 | −20 | 0.97 | −1.9 |
| Ex. 32 | | | | 50 | | | | 50 | | 50 | 0 | 0.84 | −3.2 |
| Ex. 33 | | | | 60 | | | | 60 | | 40 | 20 | 0.81 | −3.6 |
| Ex. 34 | | | | 90 | | | | 90 | | 10 | 80 | 0.66 | 32.2 |
| Ref. Ex. 2 | | | | −30 | | | | −30 | | — | — | 1.44 | — |

$M_{CAT}$: Catalytic metal
*Relative ratio or difference with the data of Ex. 30 being the standard
A negative thickness of coating indicates accumulation of the catalytic layer on the surface of partition walls.

As shown in Table 6, in Reference Example 2 wherein the catalytic layers are on the partition walls, the permeability to exhaust gas decreases as compared to other Examples, thereby increasing the pressure loss. In other words, when the catalytic layers are formed in the interior of partition walls as in Examples 30 to 34, the increase in pressure loss can be effectively reduced.

Figure 16:
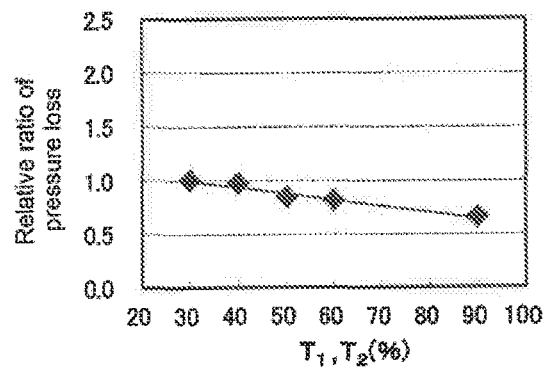
FIG. 16 is a plot showing the relationship of the catalytic layer thicknesses $T_1$, $T_2$ and the ratio of pressure loss.
Figure 17:
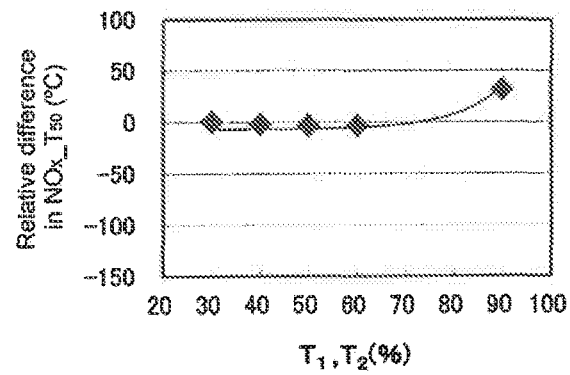
FIG. 17 is a plot showing the relationship of the catalytic layer thicknesses $T_1$, $T_2$ and the exhaust gas purification performance ($NO_x\_T_{50}$).

FIG. 16 is a plot showing the relationship of the catalytic layer thicknesses $T_1$, $T_2$ and the ratio of pressure loss. FIG. 17 is a plot showing the relationship of the catalytic layer thicknesses $T_1$, $T_2$ and the exhaust gas purification performance ($NO_{x\_}T_{50}$).

In general, with decreasing coating thickness, the coating density inside the partition wall increases; and therefore, with closed gas flow channels, the pressure loss tends to increase. On the other hand, when the coating is thick, the pressure loss decreases, but the purification performance tends to degrade because exhaust gas passes through the catalytic layers in a shorter time. As evident from Table 6 and FIGS. 16 and 17, when the thickness $T_3$ of the substrate-exposing segment satisfies $0.4T_w \leq T_3$ (e.g. $0.4T_w \leq T_3 \leq 0.6T_w$), that is, when the first catalytic layer's thickness $T_1$ satisfies $0.4T_w \leq T_1 \leq 0.6T_w$; and/or when the second catalytic layer's thickness $T_2$ satisfies $0.4T_w \leq T_2 \leq 0.6T_w$; and/or when the overlap between $T_1$ and $T_2$ is −20% to +20% of the total thickness $T_w$ of a partition wall, reduction of pressure loss in exhaust gas purification catalyst at large can be combined with enhancement of purification performance at a higher level.

[Study VII. Species of Catalytic Metals]

In these Examples, were used the materials listed below to prepare catalytic layer-forming slurries. Otherwise, based on Study I, were formed the first and second catalytic layers as shown in Table 7, differing solely in coating amounts (coating densities). The pressure loss and the exhaust gas purification performance were evaluated, similarly to Study I. The results are shown in the corresponding column in Table 7.

Example 35

First catalytic layer-forming slurry: 18 g alumina powder, 42 g zirconia-ceria composite oxide powder (zirconia/ceria=7/2), platinum nitrate (0.8 g Pt)
Second catalytic layer-forming slurry: 10 g alumina powder, 15 g zirconia-ceria composite oxide powder (zirconia/ceria=7/2), 2.5 g barium sulfate, rhodium nitrate (0.2 g Rh)

Example 36

First catalytic layer-forming slurry: 18 g alumina powder, 42 g zirconia-ceria composite oxide powder (zirconia/ceria=7/2), rhodium nitrate (0.2 g Rh)
Second catalytic layer-forming slurry: 10 g alumina powder, 15 g zirconia-ceria composite oxide powder (zirconia/ceria=7/2), 2.5 g barium sulfate, platinum nitrate (0.8 g Pt)

Example 37

First catalytic layer-forming slurry: 18 g alumina powder, 42 g zirconia-ceria composite oxide powder (zirconia/ceria=7/2), rhodium nitrate (0.2 g Rh)
Second catalytic layer-forming slurry: 10 g alumina powder, 15 g zirconia-ceria composite oxide powder (zirconia/ceria=7/2), 2.5 g barium sulfate, palladium nitrate (0.8 g Pd)

Figure 18:
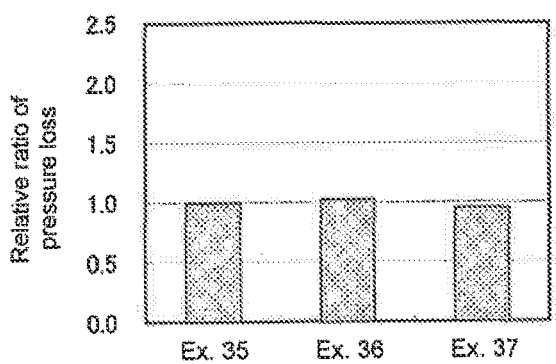
FIG. 18 is a comparison chart of the ratio of pressure loss of Examples differing in catalytic metal species.
Figure 19:
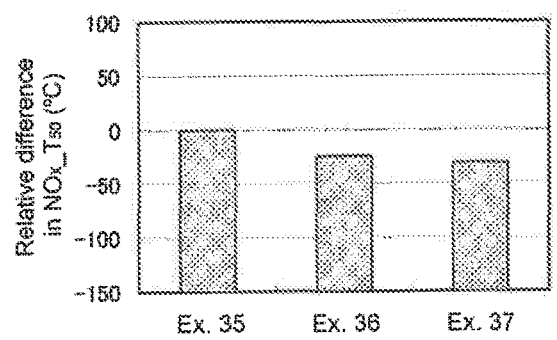
FIG. 19 is a comparison chart of the exhaust gas purification performance ($NO_x\_T_{50}$) of Examples differing in catalytic metal species.

FIG. 18 is a comparison chart of the ratio of pressure loss of Examples differing in catalytic metal species. FIG. 19 is a comparison chart of the exhaust gas purification performance ($NO_x\_T_{50}$) of Examples differing in catalytic metal species.

As compared to Example 35, the purification performance of Example 36 increased. This can be attributed to the enhanced warm-up performance of the catalyst caused by Rh with excellent activities in oxidation/reduction placed upstream (in the first catalytic layer). As compared to Example 36, the purification performance of Example 37 increased. This can be attributed to the placement of Pd in the second catalytic layer for it has greater activities for NO reduction than Pt.

[Study VIII. Alumina Content of Second Catalytic Layer]

In these Examples, the materials listed below were used to prepare the first catalytic layer-forming slurry; the same second catalytic layer-forming slurry as in Study I. was used for all. Otherwise, based on Study I, were formed the first and second catalytic layers as shown in Table 8, differing solely in alumina content of the second catalytic layer. The pressure loss and the exhaust gas purification performance were evaluated, similarly to Study I. The results are shown in the corresponding column in Table 8.

Example 38

Second catalytic layer-forming slurry: 5 g alumina powder, 20 g zirconia-ceria composite oxide powder (zirconia/ceria=7/2), 2.5 g barium sulfate, palladium nitrate (0.8 g Pd)

Example 39

Second catalytic layer-forming slurry: 6 g alumina powder, 19 g zirconia-ceria composite oxide powder (zirconia/ceria=7/2), 2.5 g barium sulfate, palladium nitrate (0.8 g Pd)

Example 40

Second catalytic layer-forming slurry: 10 g alumina powder, 15 g zirconia-ceria composite oxide powder (zirconia/ceria=7/2), 2.5 g barium sulfate, palladium nitrate (0.8 g Pd)

Example 41

Second catalytic layer-forming slurry: 18 g alumina powder, 7 g zirconia-ceria composite oxide powder (zirconia/ceria=7/2), 2.5 g barium sulfate, palladium nitrate (0.8 g Pd)

TABLE 7

Studies on catalytic metals

| | First catalytic layer | | | | Second catalytic layer | | | | Test results | |
| --- | --- | --- | --- | --- | --- | --- | --- | --- | --- | --- |
| | $M_{CAT}$ | $L_1$ (%) | Amt of coating (g) | $T_1$ (%) | $M_{CAT}$ | $L_2$ (%) | Amt of coating (g) | $T_2$ (%) | Ratio of pressure loss* | $NO_x$ $T_{50}$ (° C.)* |
| Ex. 35 | Pt | 70 | 60.8 | 50 | Rh | 45 | 27.7 | 50 | 1 | (Std) |
| Ex. 36 | Rh | | 60.2 | | Pt | | 28.3 | | 1.03 | −24.6 |
| Ex. 37 | Rh | | | | Pd | | | | 0.96 | −31.5 |

$M_{CAT}$: Catalytic metal
*Relative ratio or difference with the data of Ex. 35 being the standard

Example 42

Second catalytic layer-forming slurry: 19 g alumina powder, 6 g zirconia-ceria composite oxide powder (zirconia/ceria=7/2), 2.5 g barium sulfate, palladium nitrate (0.8 g Pd)

Example 45

Second catalytic layer-forming slurry: 10 g alumina powder, 15 g zirconia-ceria composite oxide powder (zirconia/ceria=8/1), 2.5 g barium sulfate, palladium nitrate (0.8 g Pd)

TABLE 8

Studies on alumina content of second catalytic layer

| | First catalytic layer | | | | | Second catalytic layer | | | | | Test results | |
| --- | --- | --- | --- | --- | --- | --- | --- | --- | --- | --- | --- | --- |
| | $M_{CAT}$ | $L_1$ (%) | Amt of coating (g) | $A_1$ (%) | $T_1$ (%) | $M_{CAT}$ | $L_2$ (%) | Amt of coating (g) | $A_2$ (%) | $T_2$ (%) | Ratio of pressure loss* | $NO_x$ $T_{50}$ (° C.)* |
| Ex. 38 | Rh | 70 | 60.2 | 29.9 | 50 | Pd | 45 | 28.3 | 17.7 | 50 | 1 | (Std) |
| Ex. 39 | | | | | | | | | 21.2 | | 1.01 | −21.0 |
| Ex. 40 | | | | | | | | | 35.3 | | 1.05 | −21.8 |
| Ex. 41 | | | | | | | | | 63.6 | | 1.29 | −23.4 |
| Ex. 42 | | | | | | | | | 67.1 | | 1.72 | −28.9 |

Figure 20:
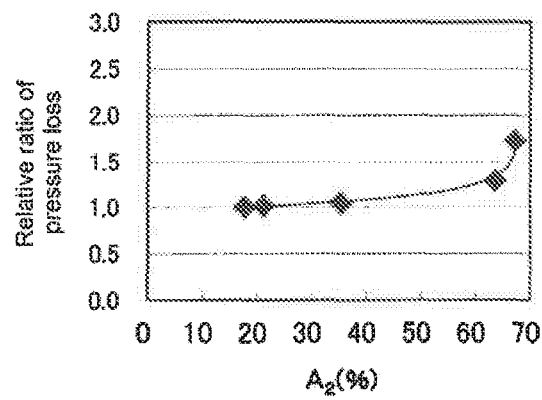
FIG. 20 is a plot showing the relationship of the alumina content $A_2$ of the second catalytic layer and the ratio of pressure loss.
Figure 21:
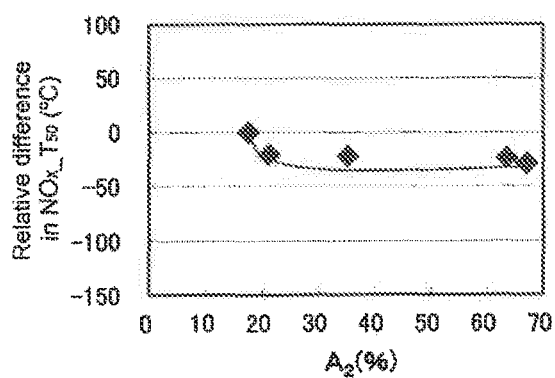
FIG. 21 is a plot showing the relationship of the alumina content $A_2$ of the second catalytic layer and the exhaust gas purification performance ($NO_x\_T_{50}$).

$M_{CAT}$: Catalytic metal
*Relative ratio or difference with the data of Ref. Ex. 38 being the standard FIG. 20 is a plot showing the relationship of the alumina content $A_2$ of the second catalytic layer and the ratio of pressure loss. FIG. 21 is a plot showing the relationship of the alumina content $A_2$ of the second catalytic layer and the exhaust gas purification performance ($NO_x\_T_{50}$).

In general, as described above, as compared to other materials, alumina tends to have high heat resistance, but a low bulk density. Thus, a high alumina content tends to increase the pressure loss; reversely, a low alumina content tends to cause degradation of purification performance. As evident from FIGS. 20 and 21, with the total non-volatile content of the second catalytic layer being 100% by mass, when the alumina content $A_2$ is 20% to 65% (e.g. 21.2% to 63.6%) by mass, reduction of pressure loss in exhaust gas purification catalyst at large can be combined with enhancement of purification performance at a higher level.

[Study IX. Cerium Content of Second Catalytic Layer]

In these Examples, the materials listed below were used to prepare the first catalytic layer-forming slurry; the same second catalytic layer-forming slurry as in Study I. was used for all. Otherwise, based on Study I, were formed the first and second catalytic layers as shown in Table 9, differing solely in cerium content of the second catalytic layer. The pressure loss and the exhaust gas purification performance were evaluated, similarly to Study I. The results are shown in the corresponding column in Table 9.

Example 43

Second catalytic layer-forming slurry: 18 g alumina powder, 7 g zirconia-ceria composite oxide powder (zirconia/ceria=8.5/0.5), 2.5 g barium sulfate, palladium nitrate (0.8 g Pd)

Example 44

Second catalytic layer-forming slurry: 18 g alumina powder, 7 g zirconia-ceria composite oxide powder (zirconia/ceria=8/1), 2.5 g barium sulfate, palladium nitrate (0.8 g Pd)

Example 46

Second catalytic layer-forming slurry: 10 g alumina powder, 15 g zirconia-ceria composite oxide powder (zirconia/ceria=7.5/1.5), 2.5 g barium sulfate, palladium nitrate (0.8 g Pd)

Example 47

Second catalytic layer-forming slurry: 10 g alumina powder, 15 g zirconia-ceria composite oxide powder (zirconia/ceria=7/2), 2.5 g barium sulfate, palladium nitrate (0.8 g Pd)

Example 48

Second catalytic layer-forming slurry: 10 g alumina powder, 15 g zirconia-ceria composite oxide powder (zirconia/ceria=6.5/2.5), 2.5 g barium sulfate, palladium nitrate (0.8 g Pd)

Example 49

Second catalytic layer-forming slurry: 10 g alumina powder, 15 g zirconia-ceria composite oxide powder (zirconia/ceria=5/4), 2.5 g barium sulfate, palladium nitrate (0.8 g Pd)

Example 50

Second catalytic layer-forming slurry: 6 g alumina powder, 19 g zirconia-ceria composite oxide powder (zirconia/ceria=5/4), 2.5 g barium sulfate, palladium nitrate (0.8 g Pd)

Example 51

Second catalytic layer-forming slurry: 6 g alumina powder, 19 g zirconia-ceria composite oxide powder (zirconia/ceria=3/6), 2.5 g barium sulfate, palladium nitrate (0.8 g Pd)

TABLE 9

Studies on cerium content of second catalytic layer

| | First catalytic layer | | | | | Second catalytic layer | | | | | Test results | |
|---|---|---|---|---|---|---|---|---|---|---|---|---|
| | $M_{CAT}$ | $L_1$ (%) | Amt of coating (g) | $C_1$ (%) | $T_1$ (%) | $M_{CAT}$ | $L_2$ (%) | Amt of coating (g) | $C_2$ (%) | $T_2$ (%) | Ratio of pressure loss* | $NO_x$ $T_{50}$ (° C.)* |
| Ex. 43 | Rh | 70 | 60.2 | 14.0 | 50 | Pd | 45 | 28.3 | 1.2 | 50 | 1 | (Std) |
| Ex. 44 | | | | | | | | | 2.5 | | 1.02 | −12.2 |
| Ex. 45 | | | | | | | | | 5.3 | | 0.94 | −20.3 |
| Ex. 46 | | | | | | | | | 8.0 | | 0.87 | −27.6 |
| Ex. 47 | | | | | | | | | 10.6 | | 0.84 | −27.4 |
| Ex. 48 | | | | | | | | | 13.3 | | 0.91 | −28.3 |
| Ex. 49 | | | | | | | | | 21.2 | | 0.92 | −22.5 |
| Ex. 50 | | | | | | | | | 26.9 | | 0.83 | −13.2 |
| Ex. 51 | | | | | | | | | 40.3 | | 0.87 | 7.7 |

Figure 22:
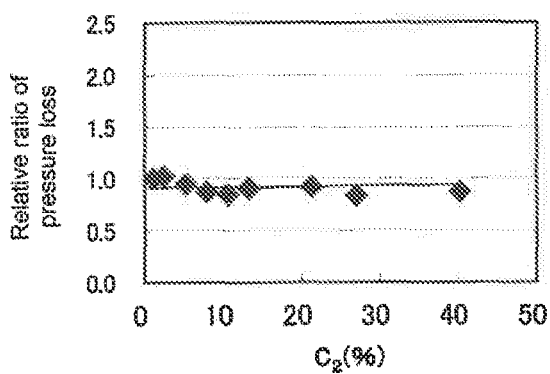
FIG. 22 is a plot showing the relationship of the ceria content $C_2$ of the second catalytic layer and the ratio of pressure loss.
Figure 23:
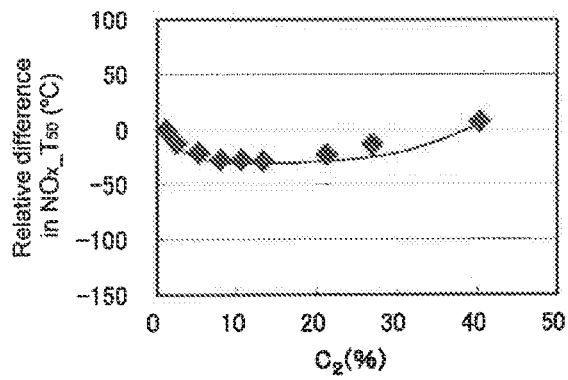
FIG. 23 is a plot showing the relationship of the ceria content $C_2$ of the second catalytic layer and the exhaust gas purification performance ($NO_x\_T_{50}$).

$M_{CAT}$: Catalytic metal
*Relative ratio or difference with the data of Ref. Ex. 43 being the standard FIG. 22 is a plot showing the relationship of the ceria content $C_2$ of the second catalytic layer and the ratio of pressure loss. FIG. 23 is a plot showing the relationship of the ceria content $C_2$ of the second catalytic layer and the exhaust gas purification performance ($NO_x\_T_{50}$).

As evident in FIGS. 22 and 23, with the total non-volatile content of the second catalytic layer being 100% by mass, when the cerium content $C_2$ is 2% to 30% (e.g. 2.5% to 26.9%) by mass, reduction of pressure loss in exhaust gas purification catalyst at large can be combined with enhancement of purification performance at a higher level.

[Study X. Barium Content of Second Catalytic Layer]

In these Examples, the materials listed below were used to prepare the first catalytic layer-forming slurry; the same second catalytic layer-forming slurry as in Study I. was used for all. Otherwise, based on Study I, were formed the first and second catalytic layers as shown in Table 10, differing solely in barium sulfate content in the second catalytic layer. The pressure loss and the exhaust gas purification performance were evaluated, similarly to Study I. The results are shown in the corresponding column in Table 10.

Example 52

Second catalytic layer-forming slurry: 10 g alumina powder, 15 g zirconia-ceria composite oxide powder (zirconia/ceria=7/2), 1.2 g barium sulfate, palladium nitrate (0.8 g Pd)

Example 53

Second catalytic layer-forming slurry: 10 g alumina powder, 15 g zirconia-ceria composite oxide powder (zirconia/ceria=7/2), 2.3 g barium sulfate, palladium nitrate (0.8 g Pd)

Example 54

Second catalytic layer-forming slurry: 10 g alumina powder, 15 g zirconia-ceria composite oxide powder (zirconia/ceria=7/2), 2.5 g barium sulfate, palladium nitrate (0.8 g Pd)

Example 55

Second catalytic layer-forming slurry: 10 g alumina powder, 15 g zirconia-ceria composite oxide powder (zirconia/ceria=7/2), 2.8 g barium sulfate, palladium nitrate (0.8 g Pd)

Example 56

Second catalytic layer-forming slurry: 10 g alumina powder, 15 g zirconia-ceria composite oxide powder (zirconia/ceria=7/2), 5.9 g barium sulfate, palladium nitrate (0.8 g Pd)

Example 57

Second catalytic layer-forming slurry: 10 g alumina powder, 15 g zirconia-ceria composite oxide powder (zirconia/ceria=7/2), 11.8 g barium sulfate, palladium nitrate (0.8 g Pd)

TABLE 10

Studies on barium content of second catalytic layer

| | First catalytic layer | | | | | Second catalytic layer | | | | | | Test results | |
|---|---|---|---|---|---|---|---|---|---|---|---|---|---|
| | $M_{CAT}$ | $L_1$ (%) | Amt of coating (g) | $T_1$ (%) | $M_{CAT}$ | $L_2$ (%) | Amt of coating (g) | $BaSO_4$ (%) | Ba (%) | $T_2$ (%) | Ratio of pressure loss* | $NO_x$ $T_{50}$ (° C.)* |
| Ex. 52 | Rh | 70 | 60.2 | 50 | Pd | 45 | 27.0 | 4.4 | 2.6 | 50 | 1 | (Std) |
| Ex. 53 | | | | | | | 28.1 | 8.2 | 4.8 | | 0.98 | −14.9 |
| Ex. 54 | | | | | | | 28.3 | 8.8 | 5.2 | | 1.00 | −14.8 |
| Ex. 55 | | | | | | | 28.6 | 9.8 | 5.8 | | 1.08 | −18.1 |
| Ex. 56 | | | | | | | 31.7 | 18.6 | 11.0 | | 1.26 | −16.0 |
| Ex. 57 | | | | | | | 37.6 | 31.4 | 18.5 | | 1.74 | −18.1 |

Figure 24:
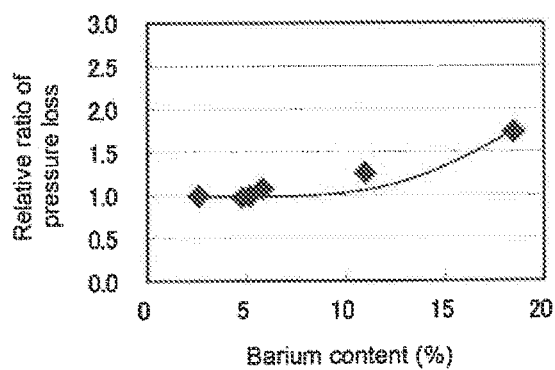
FIG. 24 is a plot showing the relationship of the barium content of the second catalytic layer and the ratio of pressure loss.
Figure 25:
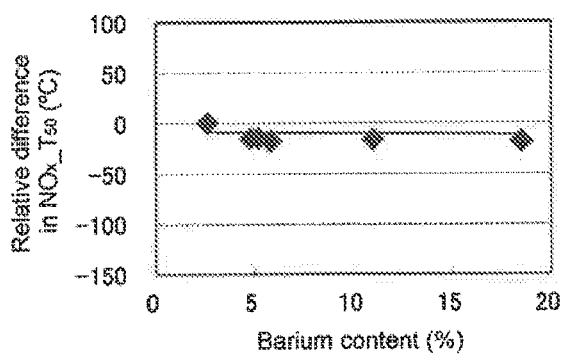
FIG. 25 is a plot showing the relationship of the barium content of the second catalytic layer and the exhaust gas purification performance ($NO_x\_T_{50}$).

$M_{CAT}$: Catalytic metal
*Relative ratio or difference with the data of Ref. Ex. 52 being the standard FIG. 24 is a plot showing the relationship of the barium content of the second catalytic layer and the ratio of pressure loss. FIG. 25 is a plot showing the relationship of the barium content of the second catalytic layer and the exhaust gas purification performance ($NO_{x\_}T_{50}$).

at 150° C. for one hour, and calcined at 500° C. for one hour to form the second catalytic layers in some pores in the partition walls in contact with the exit cells.

Exhaust gas purification catalysts were thus obtained. The features of the catalytic layers are summarized in Table 11 below.

TABLE 11

Studies on length $L_2$ of second catalytic layer

| | First catalytic layer | | | | Second catalytic layer | | | | Over-lap $T$ (%) | Test results | |
|---|---|---|---|---|---|---|---|---|---|---|---|
| | $M_{CAT}$ | $L_1$ (%) | Amt of coating (g) | $T_1$ (%) | $M_{CAT}$ | $L_2$ (%) | Amt of coating (g) | $T_2$ (%) | | Ratio of pressure loss* | Quantity Purified* |
| Ex. 58 | Rh | 70 | 90 | 35 | Rh | 30 | 90 | 35 | 0 | 1.15 | 0.986 |
| Ex. 59 | | | | | | 40 | | | 10 | 1 | (Std) |
| Ex. 60 | | | | | | 50 | | | 20 | 0.97 | 1.003 |
| Ex. 61 | | | | | | 60 | | | 30 | 0.60 | 1.010 |
| Ex. 62 | | | | | | 75 | | | 45 | 0.69 | 1.007 |
| Ex. 63 | | | | | | 80 | | | 50 | 0.88 | 1.011 |

$M_{CAT}$: Catalytic metal
*Relative ratio with the data of Ex. 59 being the standard In general, barium added to a catalytic layer inhibits HC-poisoning and sintering of the precious metal. This increases purification performance. However, when barium is added in excess, the barium segregates in the catalytic layer, thereby closing gas flow channels. Thus, the pressure loss tends to increase. As evident from FIGS. 24 and 25, with the total non-volatile content of the second catalytic layer being 100% by mass, when the barium content is 12% or less (e.g. 2.6% to 11%) by mass, or here, when the barium sulfate content is 20% or less (e.g. 4.4% to 18.6%) by mass, reduction of pressure loss in exhaust gas purification catalyst at large can be combined with enhancement of purification performance at a higher level.

The durability of exhaust gas purification catalysts were then tested.

In particular, first, as honeycomb substrates, were obtained cordierite wall-flow substrates having a shape as shown in FIGS. 1 and 2. Each honeycomb substrate is overall 105 mm long, 103 mm in outer diameter, 0.9 L in capacity, 300 cpsi (number of cells per square inch), 0.3 mm partition wall thickness, and 59% porosity of partition wall. Using the honeycomb substrates, were fabricated exhaust gas purification catalysts differing solely in coating length $L_2$ of the second catalytic layer in the miming direction.

First, were mixed 40 g of $Al_2O_3$ powder ($\gamma$-$Al_2O_3$) as a carrier, rhodium nitrate with 0.2 g Rh content as a catalytic metal, and a suitable amount of ion-exchanged water. The resulting mixture was mixed with stirring, dried and then calcined (at 500° C. for one hour) to obtain a Rh-carrying $Al_2O_3$ powder in which Rh was supported on $Al_2O_3$ powder. With a suitable amount of pure water, were mixed the resulting Rh-carrying powder and a zirconia-ceria composite oxide in an amount to yield 60 g of a ZC composite oxide ($ZrO_2$—$CeO_2$) upon calcination to prepare a catalytic layer-forming slurry.

The slurry was then supplied into the entrance cells via the exhaust inlet-side ends of the honeycomb substrates, dried at 150° C. for one hour and calcined at 500° C. for one hour to form the first catalytic layers in some pores in the partition walls in contact with the entrance cells.

The slurry was then supplied into the exit cells via the exhaust outlet-side ends of the honeycomb substrates, dried <Evaluation of Pressure Loss>

With respect to the exhaust gas purification catalysts, the pressure loss (kPa) was then determined, similarly to Study I. The results are shown in the corresponding column in Table 11. Table 11 shows the ratios of pressure loss with the pressure loss of Example 59 being the standard (1).

<Endurance Test>

The exhaust gas purification catalysts were subjected to endurance test. In particular, each exhaust gas purification catalyst was set in a catalytic converter and installed downstream of an engine exhaust port. At a catalyst inlet temperature of 900° C., it was exposed to exhaust gas for 50 hours for enduring. The exhaust gas was maintained to flow evenly through the exhaust gas purification catalyst. The exhaust gas was formed in a mode where the engine operated in periodic cycles of a stoichiometric A/F (=14.6), a rich A/F (=12.0) and a fuel cut.

<Evaluation of Exhaust Gas Purification Performance after Endurance Test>

The exhaust gas purification performance was then tested with the exhaust gas purification catalysts after the endurance test. In particular, each post-endurance-test exhaust gas purification catalyst was set in a catalytic converter and installed downstream of an engine exhaust port. With the catalyst inlet temperature fixed at 400° C., while the A/F was cycled from 13.5 to 15.5 at a frequency of 1 Hz (with an amplitude of ±0.5 or ±1.0), the engine was operated to feed exhaust gas into the exhaust gas purification catalyst. The space velocity (SV) was 100000 $h^{-1}$. During this, the concentrations of CO, HC and $NO_x$ were recorded. From a plot of conversion (vertical axis) vs. A/F (horizontal axis), the HC—$NO_x$ crossover point (COP, a crossing point of HC and $NO_x$) was read to determine the quantity of exhaust gas purified. The results are shown in the corresponding column in Table 11.

Figure 26:
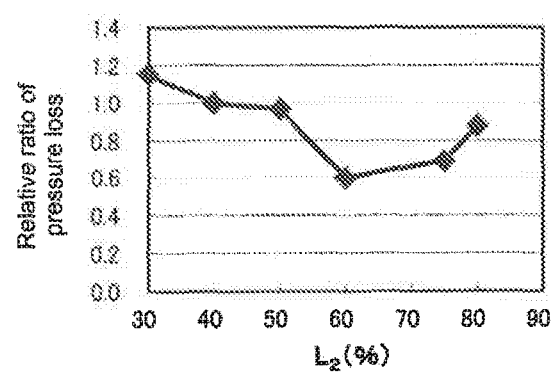
FIG. 26 is a plot showing the relationship of the second catalytic layer's length $L_2$ and the ratio of pressure loss.
Figure 27:
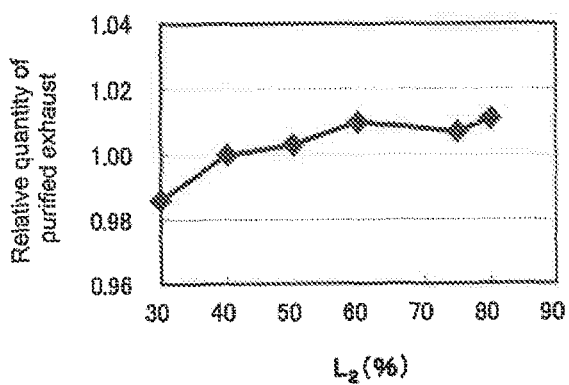
FIG. 27 is a plot showing the relationship of the second catalytic layer's length $L_2$ and the purification capacity after an endurance test.

FIG. 26 is a plot showing the relationship of the second catalytic layer's length $L_2$ and the ratio of pressure loss. FIG. 27 is a plot showing the relationship of the second catalytic layer's length $L_2$ and the purification capacity after the endurance test.

As evident from FIG. 26, because the coating amounts are constant in these Examples, the pressure loss decreases when the length $L_2$ of the second catalytic layer is 40% or more of the total length $L_w$ of the partition wall. Especially, the effect is greater when $L_2$ is 60% or more of the total length $L_w$ of the partition wall. However, when the length of the second catalytic layer is excessively long, the overlap with the first catalytic layer increases in the naming direction. Thus, the closed part of gas flow channels tends to increase, thereby increasing the pressure loss. As evident from FIG. 27, with increasing length $L_2$ of the second catalytic layer, the quantity purified increases. This can be attributed to the reduced pressure loss at the second catalytic layer, making it easier for exhaust gas to flow straight through entrance cells, thereby increasing opportunities for contact between the exhaust gas and the catalytic metals. Based on the above, when the second catalytic layer's length $L_2$ satisfies $0.4L_w \leq L_2 \leq 0.8L_w$ (e.g. $0.6L_w \leq L_2 \leq 0.75L_w$), reduction of pressure loss in exhaust gas purification catalyst at large can be combined with enhancement of purification performance at a higher level.

Specific embodiments of the present invention are described above, but these are merely for illustration and do not limit the scope of the claims. The art according to the claims include various modifications and changes made to the specific embodiments illustrated above.

REFERENCE SIGNS LIST 1 honeycomb substrate
1a end
2 closed section
4 opening
6, 26 partition walls
10 exhaust gas purification catalyst
22 plug
24 entrance cell
24a exhaust inlet-side end
25 exit cells
25a exhaust outlet-side end
261 first catalytic layer
262 second catalytic layer
26N₁ first substrate-exposing segment
26N₂ second substrate-exposing segment

The invention claimed is:

1. A wall-flow-type exhaust gas purification catalyst to be placed in an exhaust pipe of an internal combustion system to purify exhaust gas emitted from the internal combustion system, the exhaust gas purification catalyst comprising:
   a substrate having a wall-flow structure with an exhaust inlet-side end and an exhaust outlet-side end, the substrate having an entrance cell that is open on the exhaust inlet-side end and an exit cell that is open on the exhaust outlet-side end, separated with a porous partition wall,
   a first catalytic layer provided to an internal portion of the partition wall in contact with the entrance cell, having a length L1 from the exhaust inlet-side end in the running direction of the partition wall with L1 being less than the total length Lw of the partition wall in the running direction,
   a second catalytic layer provided to an internal portion of the partition wall in contact with the exit cell, having a length L2 from the exhaust outlet-side end in the running direction of the partition wall with L2 being less than the total length Lw of the partition wall in the running direction; wherein
   in the internal portion of the partition wall in contact with the entrance cell, near the exhaust outlet-side end, the exhaust gas purification catalyst has a substrate-exposing segment free of the first and second catalytic layers.

2. The exhaust gas purification catalyst according to claim 1 wherein the substrate-exposing segment is provided to an internal portion of the partition wall in contact with the entrance cell, having a length L3 from the exhaust outlet-side end in the running direction of the partition wall, with Lw and L3 satisfying 0.2Lw≤L3≤0.4Lw.

3. The exhaust gas purification catalyst according to claim 1 wherein the partition wall has a total thickness Tw in the thickness direction perpendicular to the running direction, and the substrate-exposing segment has a thickness T3, satisfying 0.4Tw≤T3.

4. The exhaust gas purification catalyst according to claim 1 wherein the first catalytic layer has a coating density D1 and the second catalytic layer has a coating density D2, with a D1/D2 ratio value of 1.3 or higher, but 1.6 or lower.

5. The exhaust gas purification catalyst according to claim 1 wherein the first catalytic layer and the second catalytic layer are formed, partially overlapping in the running direction, so that Lw, L1 and L2 satisfy 1.005Lw≤(L1+L2) ≤1.3Lw.

6. The exhaust gas purification catalyst according to claim 1 wherein Lw and L2 satisfy 0.4Lw≤L2≤0.8Lw.

7. The exhaust gas purification catalyst according to claim 1 wherein
   the partition wall has a total thickness Tw in the thickness direction perpendicular to the running direction,
   the first catalytic layer has a thickness T1 satisfying 0.4Lw≤T1≤0.6Tw, and
   the second catalytic layer has a thickness T2, satisfying 0.4Tw≤T2≤0.6Tw.

8. The exhaust gas purification catalyst according to claim 1 wherein
   the first catalytic layer comprises alumina, and
   with the total non-volatile content of the first catalytic layer being 100% by mass, the alumina accounts for 15% to 50% by mass.

9. The exhaust gas purification catalyst according to claim 1 wherein
   the first catalytic layer comprises cerium, and
   with the total non-volatile content of the first catalytic layer being 100% by mass, the cerium accounts for 5% to 35% by mass.

10. The exhaust gas purification catalyst according to claim 1 wherein the first catalytic layer comprises rhodium.

11. The exhaust gas purification catalyst according to claim 1 wherein the second catalytic layer comprises palladium.

12. The exhaust gas purification catalyst according to claim 1 wherein
   the second catalytic layer comprises alumina, and
   with the total non-volatile content of the second catalytic layer being 100% by mass, the alumina accounts for 20% to 65% by mass.

13. The exhaust gas purification catalyst according to claim 1 wherein
   the second catalytic layer comprises cerium, and
   with the total non-volatile content of the second catalytic layer being 100% by mass, the cerium accounts for 2% to 30% by mass.

14. The exhaust gas purification catalyst according to claim 1 wherein
the second catalytic layer comprises barium, and
with the total non-volatile content of the second catalytic layer being 100% by mass, the barium accounts for 12% by mass or less.

\* \* \* \* \*